(12) United States Patent
Sigler et al.

(10) Patent No.: US 10,675,704 B2
(45) Date of Patent: Jun. 9, 2020

(54) ALTERNATELY DIRECT RESISTANCE SPOT WELDING OF AL-TO-AL, AL-TO-STEEL, AND STEEL-TO-STEEL WITH WELDING ELECTRODE HAVING OXIDE-DISRUPTING STRUCTURAL FEATURES

(71) Applicant: GM GLOBAL TECHNOLOGY OPERATIONS LLC, Detroit, MI (US)

(72) Inventors: David R. Sigler, Shelby Township, MI (US); Blair E. Carlson, Ann Arbor, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 334 days.

(21) Appl. No.: 15/492,482

(22) Filed: Apr. 20, 2017

(65) Prior Publication Data

US 2017/0304928 A1    Oct. 26, 2017

Related U.S. Application Data

(60) Provisional application No. 62/326,089, filed on Apr. 22, 2016, provisional application No. 62/326,092, filed on Apr. 22, 2016.

(51) Int. Cl.
*B23K 11/31* (2006.01)
*B23K 11/30* (2006.01)
(Continued)

(52) U.S. Cl.
CPC .......... *B23K 11/315* (2013.01); *B23K 11/115* (2013.01); *B23K 11/20* (2013.01);
(Continued)

(58) Field of Classification Search
CPC ... B23K 11/115; B23K 2103/20; B23K 11/20; B23K 11/3009; B23K 35/0205;
(Continued)

(56) References Cited

U.S. PATENT DOCUMENTS 5,302,797 A    4/1994    Yasuyama et al.
5,304,769 A    4/1994    Ikegami et al.
(Continued)

FOREIGN PATENT DOCUMENTS

CN    1946506    4/2007
CN    102059439    5/2011
(Continued)

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.
(Continued)

*Primary Examiner* — Serkan Akar
*Assistant Examiner* — Chris Q Liu
(74) *Attorney, Agent, or Firm* — Reising Ethington P.C.

(57) ABSTRACT

A method of resistance spot welding workpiece stack-ups of different combinations of metal workpieces with a single weld gun using the same set of welding electrodes is disclosed. In this method, a set of opposed welding electrodes that include an original shape and oxide-disrupting structural features are used to resistance spot weld at least two of the following types of workpiece stack-ups in a particular sequence: (1) a workpiece stack-up of two or more aluminum workpieces; (2) a workpiece stack-up that includes an aluminum workpiece and an adjacent steel workpiece; and (3) a workpiece stack-up of two or more steel workpieces. The spot welding sequence calls for com-
(Continued)

pleting all of the aluminum-to-aluminum spot welds and/or all of the steel-to-steel spot welds last.

16 Claims, 10 Drawing Sheets

(51) Int. Cl.
| | |
|---|---|
| B23K 11/11 | (2006.01) |
| B23K 11/20 | (2006.01) |
| B23K 11/24 | (2006.01) |
| B23K 103/04 | (2006.01) |
| B23K 103/10 | (2006.01) |
| B23K 103/20 | (2006.01) |
| B23K 101/18 | (2006.01) |
| B23K 101/00 | (2006.01) |

(52) U.S. Cl.
CPC .......... *B23K 11/24* (2013.01); *B23K 11/3009* (2013.01); *B23K 11/3063* (2013.01); *B23K 2101/006* (2018.08); *B23K 2101/18* (2018.08); *B23K 2103/04* (2018.08); *B23K 2103/10* (2018.08); *B23K 2103/20* (2018.08)

(58) Field of Classification Search
CPC .............. B23K 11/185; B23K 11/3063; B23K 2103/04; B23K 11/166; B23K 2101/006; B23K 2101/18; B23K 2101/34; B23K 2103/10; B23K 11/14; B23K 11/24; B23K 11/34; B23K 35/0261; B23K 11/0033; B23K 11/16; B23K 11/163; B23K 11/256; B23K 11/30; B23K 11/3018; B23K 11/314; B23K 11/36; B23K 15/0093; B23K 2103/02; B23K 2103/08; B23K 26/323; B23K 35/002; B23K 35/004; B23K 35/222; B23K 35/302; B23K 9/232
USPC ........... 219/91.2, 119, 118, 93, 117.1, 86.22, 219/91.22, 121.14, 121.64, 136, 137 R, 219/86.1, 86.23, 86.31, 87, 91.23, 92, 94
See application file for complete search history.

(56) References Cited

U.S. PATENT DOCUMENTS

| | | | |
|---|---|---|---|
| 5,783,794 | A | 7/1998 | Oikawa et al. |
| 6,037,559 | A | 3/2000 | Okabe et al. |
| 7,850,059 | B2 | 12/2010 | Kobayashi et al. |
| 7,935,908 | B2 | 5/2011 | Nakagawa et al. |
| 7,951,465 | B2 | 5/2011 | Urushihara et al. |
| 7,984,840 | B2 | 7/2011 | Kobayashi et al. |
| 8,020,749 | B2 | 9/2011 | Kobayashi et al. |
| 8,058,584 | B2 | 11/2011 | Miyamoto et al. |
| 8,436,269 | B2 * | 5/2013 | Sigler ............. B23B 5/166 219/119 |
| 8,487,206 | B2 | 7/2013 | Urushihara et al. |
| 8,502,105 | B2 | 8/2013 | Tanaka et al. |
| 8,525,066 | B2 * | 9/2013 | Sigler ............. B23K 11/115 219/119 |
| 9,676,065 | B2 | 6/2017 | Sigler et al. |
| 2005/0218121 | A1 | 10/2005 | Hayashi et al. |
| 2005/0247679 | A1 | 11/2005 | Wang |
| 2007/0212565 | A1 | 9/2007 | Urushihara et al. |
| 2009/0255908 | A1 | 10/2009 | Sigler et al. |
| 2011/0097594 | A1 | 4/2011 | Tanaka et al. |
| 2012/0021240 | A1 | 1/2012 | Urushihara et al. |
| 2013/0189023 | A1 | 7/2013 | Spinella |
| 2013/0263638 | A1 | 10/2013 | Gugel et al. |
| 2013/0306604 | A1 | 11/2013 | Sigler et al. |
| 2014/0305912 | A1 | 10/2014 | Taniguchi et al. |
| 2014/0360986 | A1 | 12/2014 | Sigler et al. |
| 2015/0053654 | A1 | 2/2015 | Sigler et al. |
| 2015/0053655 | A1 | 2/2015 | Sigler et al. |
| 2015/0083693 | A1 | 3/2015 | Schroth et al. |
| 2015/0096961 | A1 * | 4/2015 | Carlson ............. B23K 11/20 219/91.2 |
| 2015/0096962 | A1 | 4/2015 | Sigler et al. |
| 2015/0231729 | A1 | 8/2015 | Yang et al. |
| 2015/0231730 | A1 | 8/2015 | Sigler et al. |
| 2015/0352658 | A1 | 12/2015 | Yang et al. |
| 2015/0352659 | A1 | 12/2015 | Sigler et al. |
| 2016/0016252 | A1 | 1/2016 | Edwards, II |
| 2016/0158874 | A1 | 6/2016 | Wang et al. |
| 2016/0279732 | A1 | 9/2016 | Sigler et al. |
| 2016/0288242 | A1 | 10/2016 | Sigler et al. |
| 2016/0346865 | A1 | 12/2016 | Sigler et al. |
| 2017/0008118 | A1 | 1/2017 | Yang et al. |
| 2017/0106466 | A1 | 4/2017 | Sigler et al. |
| 2017/0157697 | A1 | 6/2017 | Yang et al. |
| 2017/0225262 | A1 | 8/2017 | Sigler et al. |
| 2017/0225263 | A1 | 8/2017 | Sigler et al. |
| 2017/0232548 | A1 | 8/2017 | Carlson et al. |
| 2017/0252853 | A1 | 9/2017 | Wang et al. |
| 2017/0282303 | A1 | 10/2017 | Wang et al. |
| 2017/0291246 | A1 | 10/2017 | Sigler et al. |
| 2017/0291247 | A1 | 10/2017 | Sigler et al. |
| 2017/0291248 | A1 | 10/2017 | Sigler et al. |
| 2017/0297134 | A1 | 10/2017 | Sigler et al. |
| 2017/0297135 | A1 | 10/2017 | Sigler et al. |
| 2017/0297136 | A1 | 10/2017 | Brown et al. |
| 2017/0297137 | A1 | 10/2017 | Perry et al. |
| 2017/0297138 | A1 | 10/2017 | Sigler et al. |
| 2017/0304925 | A1 | 10/2017 | Sigler et al. |
| 2017/0361392 | A1 | 12/2017 | Sigler et al. |

FOREIGN PATENT DOCUMENTS

| | | |
|---|---|---|
| CN | 102114574 | 7/2011 |
| CN | 102343474 A | 2/2012 |
| CN | 103658957 A | 3/2014 |
| CN | 104084686 A | 10/2014 |
| JP | 11342477 | 12/1999 |
| JP | 2011224578 | 11/2011 |
| JP | 2013151017 | 8/2013 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high steel strength with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

(56) References Cited

OTHER PUBLICATIONS

Mortazavi et al., "Investigation on Joint Strength of Dissimilar Resistance Spot welds of Aluminum Alloy and Low Carbon Steel," Advanced Materials Research, vols. 264-265 (2011) pp. 384-389.
Qiu et al., "Resistance Spot Welding between Aluminum Alloy and Low-Carbon Steel," Advanced Materials Research, vols. 189-193 (2011) pp. 3534-3540.
Qui et al., "Interfacial microstructure and strength of steel/aluminum alloy joints welded by resistance spot welding with cover plate," Journal of Materials Processing Technology, 209 (2009) pp. 4186-4193.
Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.
English translation of CN 102059439 to Mazda Motor (published May 18, 2011).
English translation JP 2011224578 to Kobe Steel (published Nov. 10, 2011).
English translation of JP2013151017 to Mazda Motor (published Aug. 8, 2013).
Haselhuhn et al., U.S. Appl. No. 15/807,219 entitled "Electrode Weld Face Design," filed Nov. 8, 2017.
Sigler et al., U.S. Appl. No. 15/907,996 entitled "Improving Mechanical Performance of Al-Steel Weld Joints by Limiting Steel Sheet Deformation," filed Feb. 28, 2018.
Sigler et al., U.S. Appl. No. 15/920,784 entitled "Resistance Spot Welding Workpiece Stack-Ups Having a Steel Workpiece and an Aluminum Workpiece with a Steel Plate," filed Mar. 14, 2018.
Sigler et al., U.S. Appl. No. 15/976,163 entitled "Multi-Step Direct Welding of an Aluminum-Based Workpiece to a Steel Workpiece," filed May 10, 2018.
Yang et al., U.S. Appl. No. 15/992,748 entitled "Electrode for Resistance Spot Welding of Dissimilar Metals," filed May 30, 2018.

\* cited by examiner

ALTERNATELY DIRECT RESISTANCE SPOT WELDING OF AL-TO-AL, AL-TO-STEEL, AND STEEL-TO-STEEL WITH WELDING ELECTRODE HAVING OXIDE-DISRUPTING STRUCTURAL FEATURES

CROSS-REFERENCE TO RELATED APPLICATION(S)

This application claims the benefit of U.S. Provisional Application Nos. 62/326,089 and 62/326,092, each of which was filed on Apr. 22, 2016. The entire contents of each of the aforementioned provisional applications are incorporated herein by reference.

TECHNICAL FIELD

The technical field of this disclosure relates generally to resistance spot welding and, more particularly, to a methodology of resistance spot welding workpiece stack-ups with different combinations of metal workpieces using a single weld gun and the same set of opposed welding electrodes.

INTRODUCTION

Resistance spot welding is a well-known joining technique that relies on the resistance to the flow of an electrical current through overlapping metal workpieces and across their faying interface(s) to generate the heat needed for welding. To carry out such a welding process, a set of opposed spot welding electrodes is clamped at aligned spots on opposite sides of the workpiece stack-up, which typically includes two or three metal workpieces arranged in a lapped configuration. Electrical current is then passed through the metal workpieces from one welding electrode to the other. Resistance to the flow of this electrical current generates heat within the metal workpieces and at their faying interface(s). When the workpiece stack-up includes similar metal workpieces, such as two or more overlapping steel workpieces or two or more overlapping aluminum workpieces, the generated heat creates a molten weld pool that grows to consume the faying interface(s) and thus extends through all or part of each of stacked metal workpieces. In that regard, each of the similarly-composed metal workpieces contributes material to the comingled molten weld pool. Upon termination of the passage of electrical current through the workpiece stack-up, the molten weld pool solidifies into a weld nugget that fusion welds the adjacent metal workpieces together.

The resistance spot welding process proceeds somewhat differently when the workpiece stack-up includes dissimilar metal workpieces. Most notably, when the workpiece stack-up includes an aluminum workpiece and a steel workpiece that overlap and confront to establish a faying interface, as well as possibly one or more flanking aluminum and/or one or more flanking steel workpieces (e.g., aluminum-aluminum-steel, aluminum-steel-steel, aluminum-aluminum-aluminum-steel, aluminum-steel-steel-steel), the heat generated within the bulk workpiece material and at the faying interface of the aluminum and steel workpiece creates a molten weld pool within the aluminum workpiece. The faying surface of the steel workpiece remains solid and intact and, consequently, the steel workpiece does not melt and comingle with the molten weld pool on account of its much higher melting point, although elements from the steel workpiece, such as iron, may diffuse into the molten weld pool. This molten weld pool wets the confronting faying surface of the steel workpiece and, upon cessation of the current flow, solidifies into a weld joint that weld bonds or brazes the two dissimilar workpieces together.

Resistance spot welding is one of a handful of joining processes that can be used during the manufacture of multi-component assemblies. The automotive industry, for example, currently needs to secure various vehicle body members (e.g., body sides, cross-members, pillars, floor panels, roof panels, engine compartment members, trunk compartment members, etc.) into an integrated multi-component body structure, often referred to as a body-in-white, that supports the subsequent installation of various vehicle closure members (e.g., doors, hoods, trunk lids, lift gates, etc.). Recently, in an effort to assimilate lighter weight materials into a vehicle body structure which, in turn, can boost the fuel economy of the vehicle, there has been interest in strategically incorporating both aluminum workpieces and steel workpieces into the body-in-white. Such strategic use of these metals invariably results in workpiece stack-ups that present a variety of lapped metal workpiece combinations. For example, some of the workpiece stack-ups presented for spot welding may include two or more aluminum workpieces, two or more steel workpieces, or workpiece stack-up that includes at least a pair of adjacent aluminum and steel workpieces.

A typical process for structurally securing the body-in-white involves, first, positioning and supporting the vehicle body members relative to one another precisely as intended in the final body-in-white structure. The vehicle body members in need of joining are laid up or fitted together such that flanges or other bonding regions of the body members overlap to provide a workpiece stack-up of two or more overlapping workpieces. When the fixture of vehicle body members includes workpiece stack-ups with different combinations of metal workpieces, the workpiece stack-ups that include all steel workpieces are usually spot welded together and the workpiece stack-ups that include all aluminum workpieces are either spot welded together or joined with self-piercing rivets. The workpiece stack-ups that include aluminum and steel workpieces are also joined with self-piercing rivets although recent technological advances have made resistance spot welding a viable and dependable option. The formation of spot welds and the installation of self-piercing rivets are carried out by weld and rivet guns according to a programmed and coordinated sequence until all of the vehicle body members are secured in place. The overall assembly process is repeated over and over on a production line with the goal of steadily producing body-in-white structures at an acceptable output rate with minimum unnecessary downtime.

The initiative to develop a resistance spot welding approach that can successfully spot weld the diverse combinations of metal workpieces that may be found in a body-in-white has recently gained traction as such an approach could significantly reduce or altogether eliminate the need to use costly, weight-adding, and laborious-to-install rivets (and their associated rivet guns) during the construction of the body-in-white. But spot welding the various combinations of metal workpieces that may be presented in a workpiece stack-up poses certain challenges. For instance, specifically-tailored spot welding practices, including the use of specialized welding electrodes, have evolved over time for workpiece stack-ups with different combinations of metal workpieces based primarily on the materially different physical properties of aluminum and steel and the variety of different surface coatings that are typically included in the aluminum and steel workpieces. As a result, current vehicle assembly manufacturing plans contemplate the use of multiple dedicated weld guns on the manufacturing floor—with each weld gun being dedicated to a workpiece stack-up of a certain combination of metal workpieces—or a procedure for using more than one weld gun on a robot by physically switching weld guns each time a workpiece stack-up with a new combination of metal workpieces (relative to the last stack-up) has to be spot welded. Neither of those practices is particularly attractive solution.

Accordingly, there is a need for a resistance spot welding strategy that can spot weld different combinations of metal workpieces using a single weld gun and the same set of opposed welding electrodes, particularly in the construction of a body-in-white during current automobile manufacturing processes. The construction of the body-in-white, however, is not the only scenario in which resistance spot welding workpiece stack-ups that include diverse combinations of metal workpieces is a desirable manufacturing practice. Indeed, within the automotive industry, resistance spot welding is commonly used to assemble vehicle closure members such as doors, hoods, trunk lids, and lift gates, and circumstances may exist in which workpiece stack-ups having different combinations of metal workpieces would need to be spot welded in a manufacturing setting when assembling those types of components prior to their incorporation into a body-in-white. Moreover, other industries that typically use resistance spot welding on a manufacturing scale are also interested in developing effective and practical welding procedures that can accommodate the use of aluminum and steel workpieces and their various possible workpiece stack-up combinations. Those other industries include the aviation, maritime, railway, and building construction industries, among others.

SUMMARY

A method of resistance spot welding workpiece stack-ups of different combinations of metal workpieces with a single weld gun using the same set of welding electrodes according to various embodiments may include several steps. In one step, a weld gun that carries a set of opposed welding electrodes is provided. Each of the opposed welding electrodes has a weld face that comprises an original shape and oxide-disrupting structural features that may be in the form of a series of upstanding circular ridges, a series of recessed circular grooves, or a microtexture. In another step, a set of aluminum-to-steel spot welds may be formed with each of the aluminum-to-steel spot welds comprising a weld joint contained within an aluminum workpiece that weld bonds the aluminum workpiece to an adjacent steel workpiece. In yet another step, at least one of (1) a set of aluminum-to-aluminum spot welds may be formed before forming the set of aluminum-to-steel spot welds or (2) a set of steel-to-steel spot welds may be formed after forming the set of aluminum-to-steel spot welds. In terms of the structure of the aluminum-to-aluminum and the steel-to-steel spot welds, if present, each of the aluminum-to-aluminum spot welds comprises an aluminum nugget that fusion welds two or more aluminum workpieces together, and each of the set of steel-to-steel spot welds comprising a steel nugget that fusion welds two or more steel workpieces together.

The disclosed method may include other steps. For example, in another step, each of the weld faces of the set of opposed welding electrodes may restored to regenerate its original shape and oxide-disrupting features when each of the weld faces has been degraded. The method as described broadly above may also be practiced in connection with certain types of workpiece stack-ups. For example, a set of aluminum-to-aluminum spot welds may be formed before forming the set of aluminum-to-steel spot welds, and each of the weld faces of the set of opposed welding electrodes may be restored after forming the set of aluminum-to-steel spot welds. As another example, a set of steel-to-steel spot welds may be formed after forming the set of aluminum-to-steel spot welds, and each of the weld faces of the set of opposed welding electrodes may be restored after forming the set of steel-to-steel spot welds. In yet another example, a set of aluminum-to-aluminum spot welds may be formed before forming the set of aluminum-to-steel spot welds and a set of steel-to-steel spot welds may be formed after forming the set of aluminum-to-steel spot welds, and each of the weld faces of the set of opposed welding electrodes may be restored after forming the set of steel-to-steel spot welds.

The oxide-disrupting structural features included on the weld face of each of the opposed welding electrodes may, in one embodiment of the disclosed method, comprise a series of upstanding circular ridges. These ridges may be centered about and surround a central axis of the weld face and may project outwardly from a base weld face surface of the weld face. The series of upstanding circular ridges may include anywhere from two circular ridges to ten circular ridges starting from an innermost ridge that immediately surrounds the central axis of the weld face and ending with an outermost ridge that is farthest from the central axis of the weld face. To restore each of the weld faces having such oxide-disrupting structural features, the weld face of each welding electrode may be inserted into a cutting socket of a cutting tool so that the weld face engages a cutting surface and the central axis of the weld face is aligned with an axis of rotation of the cutting tool. The cutting surface may define recessed grooves that extend from a leading edge of the cutting surface towards a trailing edge. Additionally, the cutting tool may be rotated while the engaged with the weld face to shear away weld face material to reestablish the original shape of the weld face while the the recessed grooves fashion a new series of upstanding circular ridges that project outwardly from the base weld face surface of the weld face.

In another embodiment of the disclosed method, the oxide-disrupting structural features included on the weld face of each of the opposed welding electrodes may comprise a microtexture that includes three-dimensional microscopic peaks-and-valleys covering at least 75% a base weld face surface of the weld face to provide a surface roughness (Ra) that ranges from 2 μm to 50 μm. To restore each of the weld faces having such oxide-disrupting structural features, the weld face may be redressed by inserting the weld face into a cutting socket of a cutting tool so that the weld face engages a cutting surface and the central axis of the weld face is aligned with an axis of rotation of the cutting tool, and rotating the cutting tool while engaged with the weld face to shear away weld face material to restablish the original shape of the weld face. The weld face may then be textured with an abrasive medial to establish a new microtexture on the base weld face surface of the weld face.

Other aspects of the method of resistance spot welding workpiece stack-ups of different combinations of metal workpieces with a single weld gun using the same set of welding electrodes according to various embodiments may also be practiced. For instance, the act of restoring each of the weld faces of the set of opposed welding electrodes may be performed simultaneously without removing either of the welding electrodes from the weld gun. A wide variety of other variations of the disclosed method are also contemplated and, in fact, many such variations related to each of the various embodiments of the disclosed method are described in further detail below.

DETAILED DESCRIPTION

Figure 1:
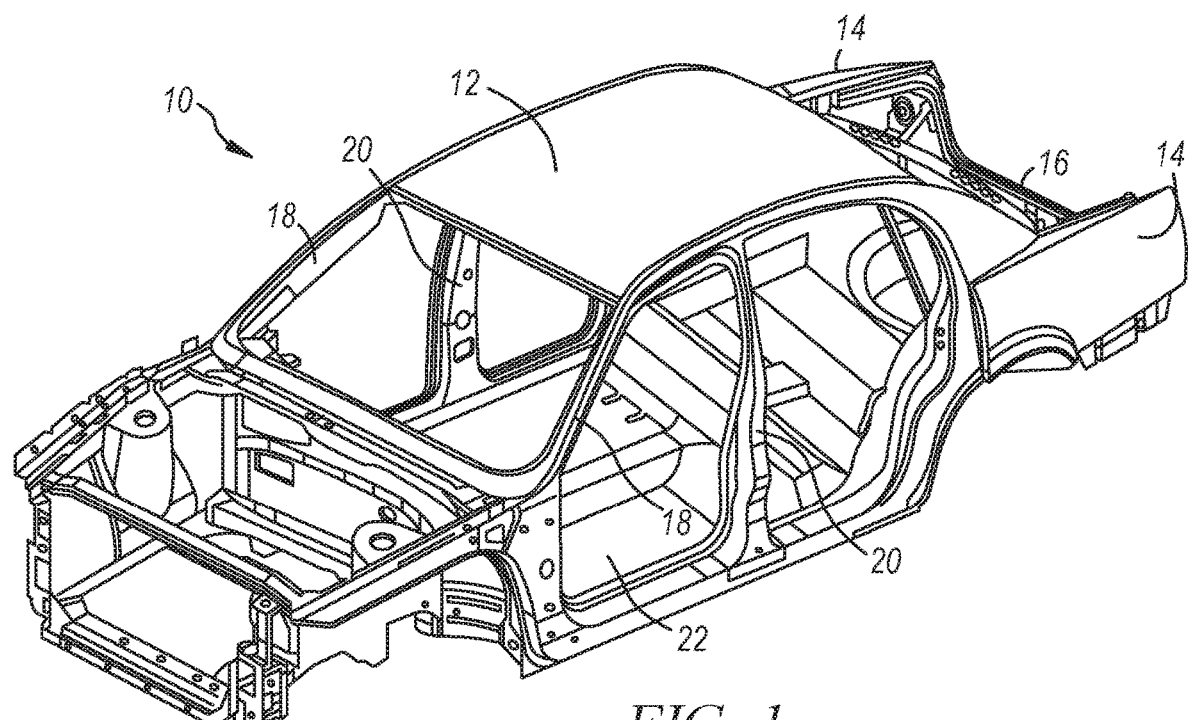
FIG. 1 illustrates a multi-component integrated assembly in the form of an automobile body-in-white that, in accordance with the disclosure, may be secured together from a fixture of individual vehicle body members by a first set of aluminum-to-aluminum spot welds, a second set of aluminum-to-steel spot welds, and a third set of steel-to-steel spot welds.

A method is disclosed that enables workpiece stack-ups of different combinations of metal workpieces to be resistance spot welded with a single weld gun using the same set of welding electrodes. The different combinations of metal workpieces that comprise the workpiece stack-ups where spot welding is practiced fall in to three categories: (1) a workpiece stack-up of two or more aluminum workpieces; (2) a workpiece stack-up that includes an aluminum workpiece and an adjacent steel workpiece along with one or more optional aluminum workpieces and/or one or more optional steel workpieces so long as all of the aluminum workpieces and all of the steel workpieces are disposed adjacent to each other; or (3) a workpiece stack-up of two or more steel workpieces. The terms "aluminum workpiece" and "steel workpiece" are used broadly in the present disclosure and encompass any resistance spot weldable form of aluminum and steel, respectively. Some preferred and specific examples of aluminum and steel workpieces are described in more detail below.

The three categories of workpiece stack-ups just mentioned can be resistance spot welded with a single weld gun without having to substitute welding electrodes or otherwise retool the weld gun each time a workpiece stack-up with of a different category (relative to the last workpiece stack-up) is encountered. To achieve this type of production flexibility and simplicity, a design configuration that calls for oxide-disrupting structural features to be present on the weld face is embodied by each of the welding electrodes carried by the weld gun, and the three categories of workpiece stack-ups are spot welded in a specific scheduled sequence. Specifically, regarding the scheduled spot welding sequence, the workpiece stack-ups that include two or more aluminum workpieces (category 1 above) are spot welded first, the workpiece stack-ups that include an aluminum workpiece and an adjacent steel workpiece (category 2 above) are spot welded second, and the workpiece stack-ups that include two or more steel workpieces (category 3 above) are spot welded last.

The weld faces of the welding electrodes may also be periodically restored at any time to regenerate their original shape and configuration. The weld faces may be restored whenever it has been determined that the weld faces have been degraded to the point that further spot welding would result in compromised weld quality. To be sure, successively spot welding the workpiece stack-ups that include two or more aluminum workpieces, the workpiece stack-ups that include an aluminum workpiece and an adjacent steel workpiece, and the workpiece stack-ups that include two or more steel workpieces will result in accelerated degradation of the weld faces of the welding electrodes. Contact between the weld face and an aluminum workpiece during welding (which may occur when welding the category 1 or 2 workpiece stack-ups mentioned above) results in a reaction between the copper of the weld face and the aluminum of the workpiece that can cause pitting, and contact between the weld face and a steel workpiece during welding (which may occur when welding the category 2 or 3 workpiece stack-ups mentioned above) accelerates plastic deformation of the oxide-disrupting structural features via flattening of the oxide-disrupting features and mushrooming of the weld face and, in the case of steel workpieces that include a surface layer comprising zinc, results in contamination of the weld face with zinc and zinc oxide.

The various forms of degradation that may be experienced by the weld face of each welding electrode over time can interfere with the ability of the weld face to conduct current into and out of the workpiece stack-up(s) and can cause excessive heating at the weld face/workpiece interface. Overheating at the weld face/workpiece interface can create molten metal at that interface and result in surface expulsion during welding, which indicates that the weld face needs to be restored. To create a robust process for manufacturing, weld tests can be performed to identify when the weld face of each welding electrode will achieve a level of degradation sufficient to require restoration, that is, the point at which surface expulsion will occur, and then the actual timing of weld face restoration for each of the welding electrodes can be set prior to reaching that point. Alternatively, the weld faces of the welding electrodes may be restored at certain defined times prior to reaching the point at which weld face damage produces surface expulsion. To that end, the weld faces may be restored after welding the workpiece stack-ups that include an aluminum workpiece and an adjacent steel workpiece or after welding the workpiece stack-ups that include two or more steel workpieces.

Three particular embodiments of the disclosed method of the present disclosure are described in detail below. The three embodiments differ principally in the constitution of the oxide-disrupting structural features incorporated onto the weld faces of the welding electrodes and the way in which the weld faces are restored to accommodate regeneration of their particular oxide-disrupting structural features. To be sure, the oxide-disrupting structural features included on the weld faces of the opposed welding electrodes may be in the form of a series of upstanding circular ridges, a series of recessed circular grooves, or a microtexture comprised of random three-dimensional peaks-and-valleys. Each of these oxide-disrupting structural features can effectively stress and fracture the mechanically tough and electrically insulating refractory oxide surface layer that may be initially encountered when the weld face that includes the structural features is brought into contact with an aluminum workpiece under load. Eventually, however, each of these oxide-disrupting structural features may need to be regenerated as they can become degraded during spot welding operations by way of plastic deformation and/or contamination, especially when brought into contact with a galvanized steel workpiece. To that end, the weld faces may be restored to regenerate their shape and construction including the specific oxide-disrupting structural features whenever the weld faces become degraded. Restoration of a weld face that includes upstanding circular ridges and/or recessed circular grooves may be accomplished by a redressing process while restoration of a weld face that include a microtexture may be accomplished by a combination redressing and texturing process.

A first embodiment of the disclosed method of the present disclosure is described in connection with FIGS. 1-10. In this embodiment, the oxide-disrupting structural features included on the weld faces of the opposed welding electrodes are in the form of a series of upstanding circular ridges. Referring now to FIG. 1, exemplary practices of the disclosed method of resistance spot welding multiple workpiece stack-ups that include aluminum and/or steel workpieces, in a variety of combinations, relates to the assembly of a multi-component integrated assembly 10 in the form of body-in-white during the manufacture of an automobile. The multi-component body-in-white assembly 10 depicted in FIG. 1 includes a roof panel 12, rear quarter panels 14, a rear trunk wall 16, A pillars 18, B pillars 20, and floor members 22 and related underbody structure, among other vehicle body members. Certain of these vehicle body members may be formed of an aluminum workpiece, such as the roof and quarter panels 12, 14 and the trunk wall 16, and certain of the other vehicle body members may be formed of a steel workpiece, such as the A and B pillars 18, 20 and the floor members 22.

Prior to being secured together into the unitary, integrated body-in-white assembly 10, the various vehicle body members 12, 14, 16, 18, 20, 22 are positioned and supported relative to one another by a fixturing device or devices. In doing so, flanges or other bonding regions of the body members 12, 14, 16, 18, 20, 22 are arranged in lapped configurations with corresponding flanges or bonding regions of other body members to provide a multitude of workpiece stack-ups with two-side access where one or more resistance spot welds can be formed to secure the vehicle body members together that contribute to each particular stack-up. Some of the established workpieces stack-ups include similar metal workpieces, i.e., all aluminum workpieces or all steel workpieces, and some of the stack-ups include a combination of aluminum and steel workpieces. An intermediate organic material such as a weld-through adhesive or a sealer may optionally be included between the lapped workpieces in each stack-up if desired.

Figure 2:
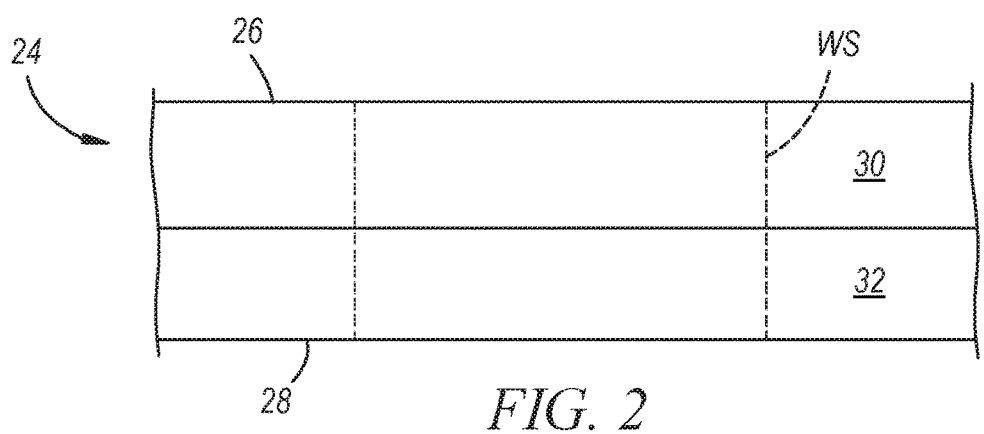
FIG. 2 is a generic workpiece stack-up that includes at least a first metal workpiece and a second metal workpiece and, furthermore, represents the various categories of workpiece stack-ups that are established for spot welding as part of the overall construction of the multi-component integrated assembly depicted in FIG. 1 as well as a variety of other assemblies.
Figure 2A:
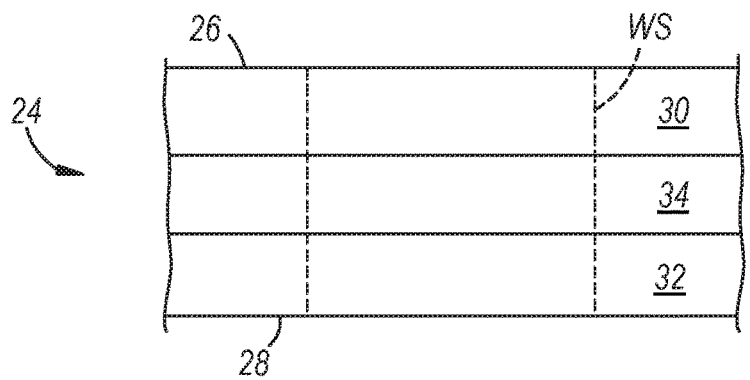
FIG. 2A depicts an another form of the generic representative workpiece stack-up shown in FIG. 1 in which the workpiece stack-up includes a third metal workpiece disposed between the first and second metal workpieces.
Figure 2B:
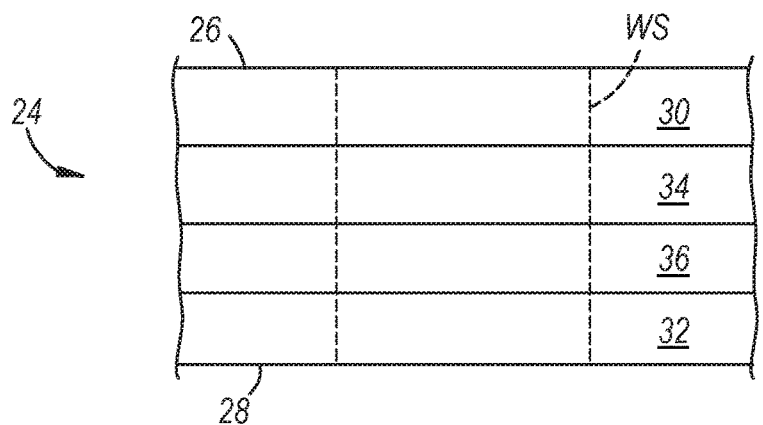
FIG. 2B depicts another form of the generic representative workpiece stack-up shown in FIG. 1 in which the workpiece stack-up includes a third metal workpiece and a fourth metal workpiece, both of which are disposed between the first and second metal workpieces.

A generic workpiece stack-up 24 is shown in FIG. 2 that represents the various categories of workpiece stack-ups that are established for spot welding as part of the overall construction of multi-component body-in-white assembly 10. The workpiece stack-up 24 has a first side 26 and a second side 28 and includes at least a first metal workpiece 30 and an adjacent overlapping second metal workpiece 32. The first metal workpiece 30 provides the first side 26 of the stack-up 24 and the second metal workpiece 32 provides the second side 28. Each of the first and second sides 26, 28 is accessible to a spot welding electrode such that the workpiece stack-up 24 can be clamped between a pair of opposed spot welding electrodes at a weld site WS. In some implementations, the workpiece stack-up 24 includes only the first and second metal workpieces 30, 32 (a "2T" stack-up). In other implementations, a third metal workpiece 34 may be positioned between the first and second metal workpieces 30, 32 and extend through the weld site WS (a "3T" stack-up), as shown in FIG. 2A. Still further, in other implementations, a fourth metal workpiece 36 may be positioned between the first and second metal workpieces 30, 32 and extend through the weld site WS along with the third metal workpiece 34 (a "4T" stack-up), as shown in FIG. 2B.

Each of the aluminum workpieces that may be included in the workpiece stack-up 24 contains an aluminum substrate that is either coated or uncoated. The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, and an aluminum-zinc alloy. If coated, the aluminum substrate may include a surface layer of a refractory oxide material (native and/or produced during manufacture when exposed to high-temperatures, e.g., mill scale) comprised of aluminum oxide compounds and possibly other oxide compounds such as, for example, those of magnesium oxide if the aluminum substrate contains magnesium. The aluminum substrate may also be coated with a layer of zinc, tin, or a metal oxide conversion coating comprised of oxides of titanium, zirconium, chromium, or silicon, as described in US Pat. Pub. No. 2014/0360986. The surface layer may have a thickness ranging from 1 nm to 10 μm and may be present on each side of the aluminum substrate. Taking into account the thickness of the aluminum substrate and the surface layer that may be present, the aluminum workpiece(s) may have a thickness that ranges from 0.3 mm to about 6.0 mm, or more narrowly from 0.5 mm to 3.0 mm, at least at the weld site WS.

The aluminum substrate of each of the aluminum workpieces may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, 6xx.x, or 7xx.x series aluminum alloy casting. Some more specific kinds of aluminum alloys that may constitute the aluminum substrate include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si-Mg aluminum die casting alloy. The aluminum substrate may further be employed in a variety of tempers including annealed (O), strain hardened (H), and solution heat treated (T), if desired. When more than one aluminum workpiece is present in the workpiece stack-up 24, the aluminum substrates of those aluminum workpieces may be the same or different in terms of their compositions, thicknesses, and/or form (e.g., wrought or cast).

Each of the steel workpiece that may be included in the workpiece stack-up 24 contains a steel substrate of any of a wide variety of strengths and grades that is either coated or uncoated. The steel substrate may be hot-rolled or cold-rolled and may be composed of steel such as mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece includes press-hardened steel (PHS). If coated, the steel substrate preferably includes a surface layer of zinc (e.g., hot-dip galvanized or electrogalvanized), a zinc-iron alloy (e.g., galvannealed or electrodeposited), a zinc-nickel alloy, nickel, aluminum, an aluminum-magnesium alloy, an aluminum-zinc alloy, or an aluminum-silicon alloy, any of which may have a thickness of up to 50 μm and may be present on each side of the steel substrate. Taking into account the thickness of the steel substrate and any surface layer that may be present, the steel workpiece(s) may have a thickness that ranges from 0.3 mm and 6.0 mm, or more narrowly from 0.6 mm to 2.5 mm, at least at the weld site WS.

The number of combinations of metal workpieces that may be included in the workpiece stack-up 24 is not insignificant. When the workpiece stack-up 24 includes only the first and second metal workpieces 30, 32, each of the first and second metal workpieces 30, 32 may be an aluminum workpiece, each of the first and second metal workpieces 30, 32 may be a steel workpiece, or one of the first or second metal workpieces 30, 32 may be an aluminum workpiece and the other of the first or second metal workpieces may be a steel workpiece. Additionally, when an aluminum workpiece and an adjacent steel workpiece are present, the relative positioning of the metal workpieces 30, 32 can be altered. More specifically, the first metal workpiece 30 may be an aluminum workpiece and the second metal workpiece 32 may be a steel workpiece, or the first metal workpiece 30 may be a steel workpiece and the second metal workpiece may be an aluminum workpiece 32. The number of possible metal workpiece combinations increases as additional metal workpieces become incorporated into the stack-up 24 as illustrated above in FIGS. 2A-2B and discussed in more detail below.

When the workpiece stack-up 24 includes the first, second, and third metal workpieces 30, 34, 32, each of the metal workpieces 30, 34, 32 may be an aluminum workpiece, each of the metal workpieces 30, 34, 32 may be a steel workpiece, two of the adjacent metal workpieces 30, 32, 36 may be aluminum workpieces and the other metal workpiece may be a steel workpiece, or two of the adjacent metal workpieces 30, 34, 32 may be steel workpieces and the other metal workpiece may be an aluminum workpiece. Again, like before, the relative positioning of the metal workpieces 30, 34, 32 may be altered when the workpiece stack-up 24 includes an aluminum workpiece and an adjacent steel workpiece. More specifically, the combination of workpieces in the stack-up 24 may be any of the following, which are listed in the order of (first metal workpiece 30)-(third metal workpiece 34)-(second metal workpiece 32): aluminum-aluminum-steel, steel-aluminum-aluminum, steel-steel-aluminum, or aluminum-steel-steel.

Finally, when the workpiece stack-up 24 includes the first, second, third, and fourth metal workpieces 30, 34, 36, 32 each of the metal workpieces 30, 34, 36, 32 may be an aluminum workpiece, each of the metal workpieces 30, 34, 36, 32 may be a steel workpiece, two of the adjacent metal workpieces 30, 34, 36, 32 may be aluminum workpieces and the other two adjacent metal workpieces may be steel workpieces, three of the adjacent metal workpieces 30, 34, 36, 32 may be aluminum workpieces and the other metal workpiece may be a steel workpiece, or three of the adjacent metal workpieces 30, 34, 36, 32 may be steel workpieces and the other metal workpiece may be an aluminum workpiece. The relative positioning of the metal workpieces 30, 34, 36, 32 may of course be altered when the workpiece stack-up includes an aluminum workpiece and an adjacent steel workpiece. More specifically, the combination of workpieces in the stack-up 24 may be any of the following, which are listed in the order of (first metal workpiece 30)-(third metal workpiece 34)-(fourth metal workpiece 36)-(second metal workpiece 32): aluminum-aluminum-steel-steel, steel-steel-aluminum-aluminum, aluminum-aluminum-aluminum-steel, steel-aluminum-aluminum-aluminum, steel-steel-steel-aluminum, or aluminum-steel-steel-steel.

Figure 3:
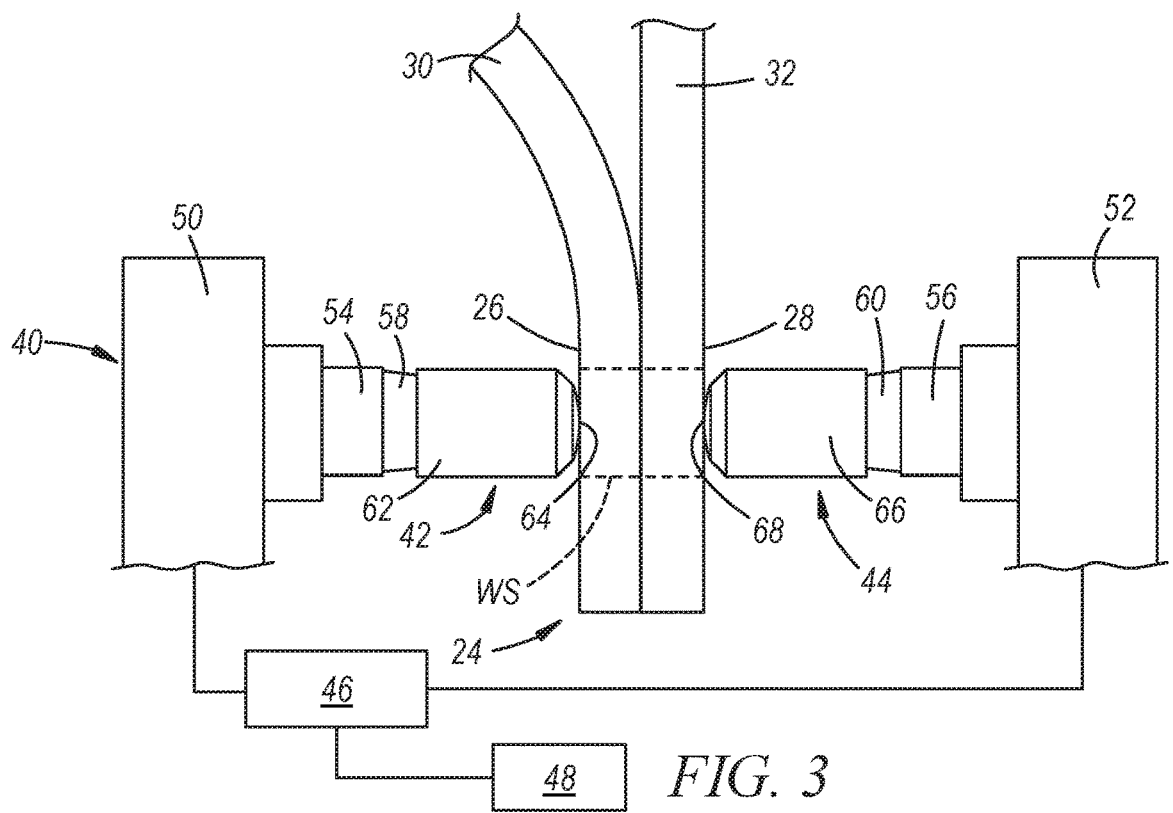
FIG. 3 illustrates a partial schematic view of a weld gun that carries a set of opposed welding electrodes and is adapted to perform the spot welding sequence of the disclosed method of the present disclosure.

In accordance with practices of the disclosed method, a single weld gun 40, which is depicted in relevant schematic part in FIG. 3, can form one or more spot welds in the various assembled workpiece stack-ups 24 to secure their constituent metal workpieces together despite the fact that a variety of different metal workpiece combinations may be encountered over the course of structurally unifying the fixture of body members into the multi-component integrated body-in-white assembly 10. The weld gun 40 carries a first welding electrode 42 and an opposed second welding electrode 44, each of which embodies a particular design configuration that can accommodate spot welding of all of the various metal workpiece combinations detailed above. Additionally, the various workpiece stack-ups 24 assembled within the fixture of vehicle body members are spot welded in a defined sequence that takes into account the way that the welding electrodes 42, 44 interact with, and are degraded by, the aluminum and steel workpieces they engage. The phrase "spot weld" is used here as a generic term that encompasses the weld nugget structure that fusion welds together overlapping aluminum workpieces or overlapping steel workpieces as well as a weld joint structure that weld bonds or brazes together an aluminum workpiece and an adjacent overlapping steel workpiece at each weld site WS where spot welding is performed.

The first and second welding electrodes 42, 44 are mechanically and electrically coupled to the weld gun 40, which can support forming a rapid succession of spot welds. The weld gun 40, for example, may be a C-type gun or an X-type gun, or some other type that is suited for high-output welding, and is preferably mounted on a robot capable of moving the weld gun 40 in and around the fixture of vehicle body members to gain access to the workpiece stack-ups 24. Additionally, as illustrated schematically here, the weld gun 40 may be associated with a power supply 46 that delivers electrical current between the welding electrodes 42, 44 according to a programmed weld schedule administered by a weld controller 48. The weld gun 40 may also be fitted with coolant lines and associated control equipment in order to deliver a cooling fluid, such as water, to each of the welding electrodes 42, 44 during spot welding operations to help manage the temperature of the electrodes 42, 44.

The weld gun 40 includes a first gun arm 50 and a second gun arm 52. The first gun arm 50 is fitted with a shank 54 that secures and retains the first welding electrode 42 and the second gun arm 52 is fitted with a shank 56 that secures and retains the second welding electrode 44. The secured retention of the welding electrodes 42, 44 on their respective shanks 54, 56 can be accomplished by way of shank adapters 58, 60 that are located at axial free ends of the shanks 54, 56. In terms of their positioning relative to the workpiece stack-up 10, the first welding electrode 42 is positioned for contact with the first side 26 of the stack-up 24, and, consequently, the second welding electrode 44 is positioned for contact with the second side 28 of the stack-up 24. The first and second weld gun arms 50, 52 are operable to converge or pinch the welding electrodes 42, 44 towards each other and to impose a clamping force on the workpiece stack-up 24 at the weld site WS once the electrodes 42, 44 are brought into contact with their respective workpiece stack-up sides 26, 28.

Each of the first and second welding electrodes 42, 44 may be constructed as a multi-ringed domed ("MRD") welding electrode and is formed of an electrically conductive material such as, for example, a copper alloy. One specific example of a suitable copper alloy is a C15000 copper-zirconium alloy (CuZr) that contains 0.10 wt % to 0.20 wt % zirconium and the balance copper. Other copper materials may of course be employed including, for example, a C18200 copper-chromium alloy (CuCr) that includes 0.6 wt % to 1.2 wt % chromium and the balance copper; a C18150 copper-chromium-zirconium alloy (CuCrZr) that includes 0.5 wt % to 1.5 wt % chromium, 0.02 wt % to 0.20 wt % zirconium, and the balance copper; or a dispersion strengthened copper material such as copper with an aluminum oxide dispersion. Still further, other compositions that possess suitable mechanical and electrical/thermal conductivity properties may also be used including more resistive electrodes that are composed of a refractory metal (e.g., molybdenum or tungsten) or a refractory metal composite (e.g. tungsten-copper).

Figure 4:
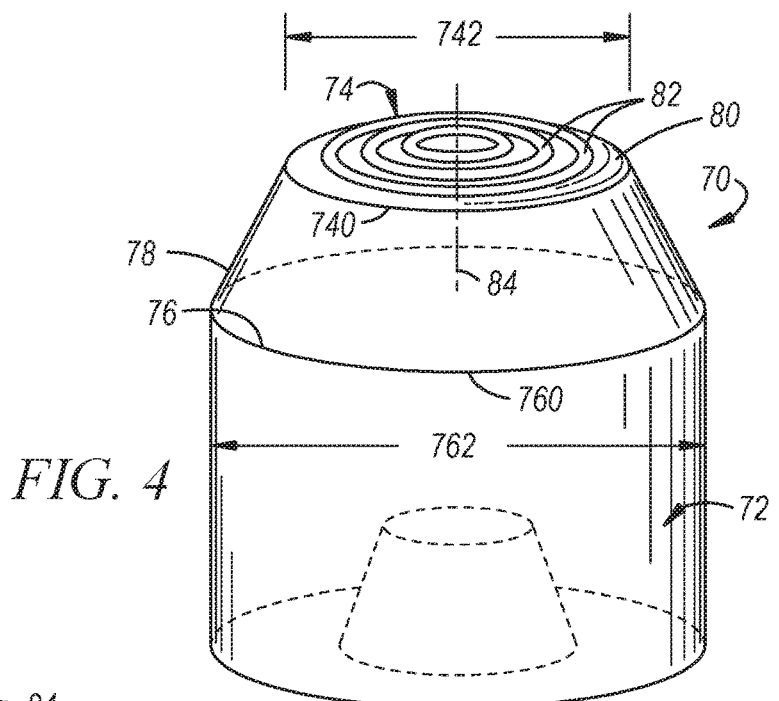
FIG. 4 is a perspective view of a welding electrode that embodies a particular electrode design (the MRD welding electrode design) and that represents the structure of each of the opposed welding electrodes carried by the weld gun shown in FIG. 3 according to a first embodiment of the disclosed method.
Figure 5:
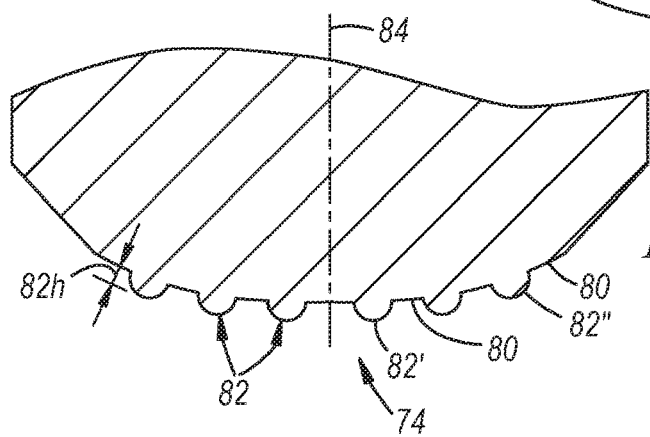
FIG. 5 is a magnified cross-sectional view of the weld face of the particular welding electrode illustrated in FIG. 4.

The first welding electrode 42 includes an electrode body 62 and a first weld face 64 and, likewise, the second welding electrode 44 includes an electrode body 66 and a second weld face 68. The weld faces 64, 68 of the first and second welding electrodes 42, 44 are the portions of the electrodes 42, 44 that are pressed against, and impressed into, the opposite sides 26, 28 of the workpiece stack-up 24 to communicate electrical current during each instance the weld gun 40 is operated to conduct spot welding. The specific structural features and dimensions of the electrode bodies 62, 66 and the weld faces 64, 68 of the first and second welding electrodes 42, 44 as dictated by the MRD electrode design are illustrated in more detail in FIGS. 4-5. In those Figures, the first and second welding electrodes 42, 44 are represented by a welding electrode identified by reference numeral 70 that has an electrode body 72 and a weld face 74. The descriptions of the electrode body 72 and the weld face 74 of the welding electrode 70 shown in FIGS. 4-5 are thus applicable to the electrode bodies 62, 66 and the weld faces 64, 68 of the first and second welding electrodes 42, 44 shown in FIG. 3.

The electrode body 72 of the MRD welding electrode 70 is preferably cylindrical in shape and includes a front end 76 having a circumference 760. A diameter 762 of the body 72 taken at the circumference 760 of its front end 76 preferably lies within the range of 12 mm to 22 mm or, more narrowly, within the range of 16 mm to 20 mm. The weld face 74 is disposed on the front end 76 of the body 72 and has a circumference 740 that is coincident with the circumference 760 of the front end 76 of the body 72 (a "full face electrode") or is upwardly displaced from the circumference 760 of the front end 76, to a distance between 2 mm and 10 mm, by a transition nose 78 of frustoconical or truncated spherical shape. If the transition nose 78 is frustoconical, the angle of truncation is preferably between 30° and 60° from a horizontal plane of the weld face circumference 740. If the transition nose 78 is spherical, the radius of curvature of the transition nose 78 preferably ranges from 6 mm to 12 mm.

The weld face 74 of the MRD welding electrode 70 preferably has a diameter 742 measured at its circumference 740 that lies within the range of 6 mm to 22 mm or, more narrowly, within the range of 8 mm to 15 mm. In terms of its shape, the weld face 74 includes a base weld face surface 80 that is convexly domed. As such, the base weld face surface 80 ascends upwards from the circumference 740 of the weld face 74 in narrowing fashion. For instance, in one particular version, the base weld face surface 80 may be spherically-shaped (i.e., it is a portion of a sphere) with a radius of curvature that lies within the range of 15 mm to 300 mm or, more narrowly, within the range of 20 mm to 50 mm. The weld face 74 also includes a series of upstanding circular ridges 82 that project outwardly from the base weld face surface 80. Under the relatively high pressures imposed on the welding electrode 70 during spot welding, these circular ridges 82 enable the MRD welding electrode 70 to establish good mechanical and electrical contact with an aluminum workpiece surface by stressing and fracturing the mechanically tough and electrically insulating refractory oxide layer that is typically present in an aluminum workpiece over the aluminum substrate, yet they do not materially interfere with current communication into and through a steel workpiece.

The series of upstanding circular ridges 82 are preferably centered about and surround a central axis 84 of the weld face 74. The base weld face surface 80 from which the ridges 82 outwardly project may account for 50% or more, and preferably between 50% and 80%, of the total surface area of the weld face 74. The remaining surface area is attributed to the series of upstanding circular ridges 82, which preferably includes anywhere from two ridges to ten ridges, or more narrowly from three to five ridges. When viewed from above in plan perspective, the several upstanding circular ridges 82 are radially spaced apart from each other by annular portions of the base weld face surface 80 such that the upstanding ridges 82 become larger in diameter when moving from an innermost upstanding ridge 82' that immediately surrounds the central axis 84 of the weld face 74 to an outermost upstanding ridge 82" that is farthest from the central axis 84 of the weld face 74 and, consequently, most proximate to the circumference 740 of the weld face 74 (FIG. 5).

The size and shape of the upstanding circular ridges 82 are subject to some variability without sacrificing their dressability. In one version, as shown best in FIG. 4, each of the upstanding circular ridges 82 has a closed circumference, meaning the ridge 82 is continuously curved when viewed from above in plan perspective such that its circumference is not interrupted. Additionally, the cross-sectional profile of each ridge 82 may lack that sharp corners and have a curved (as shown) or flat top surface. Moreover, as shown in FIG. 5, each of the circular ridges 82 also has a ridge height 82h—taken at the highest point of the ridge 82—that extends upwards from the base weld face surface 80 when viewed in cross-section. The ridge height 82h of each ridge 82 preferably ranges from 20 µm to 400 µm or, more narrowly, from 50 µm to 300 µm. And the spacing of the ridges 82 as measured between the midpoints of two adjacent ridges 82 preferably ranges from 50 µm to 1800 µm or, more narrowly, from 80 µm to 1500 µm. Each of the upstanding circular ridges 82 is preferably semicircular, truncated semicircular, or truncated triangular in cross-section.

Referring back to FIG. 3, the weld gun 40 is operable to pass electrical current between the facially-aligned weld faces 64, 68 of the first and second welding electrodes 42, 44 and through the workpiece stack-up 24 at the weld site WS. The exchanged electrical current is preferably a DC (direct current) electrical current that is delivered by the power supply 46 which, as shown, electrically communicates with the first and second welding electrodes 42, 44. The power supply 46 is preferably a medium frequency direct current (MFDC) inverter power supply that includes a MFDC transformer. A MFDC transformer can be obtained commercially from a number of suppliers including Roman Manufacturing (Grand Rapids, Mich.), ARO Welding Technologies (Chesterfield Township, Mich.), and Bosch Rexroth (Charlotte, N.C.). The characteristics of the delivered electrical current are controlled by the weld controller 48. Specifically, the weld controller 48 allows a user to program a weld schedule that sets the waveform of the electrical current being exchanged between the welding electrodes 42, 44. The weld schedule allows for customized control of the current level at any given time and the duration of current flow at any given current level, among others, and further allows for such attributes of the electrical current to be responsive to changes in very small time increments down to fractions of a millisecond.

Figure 6:
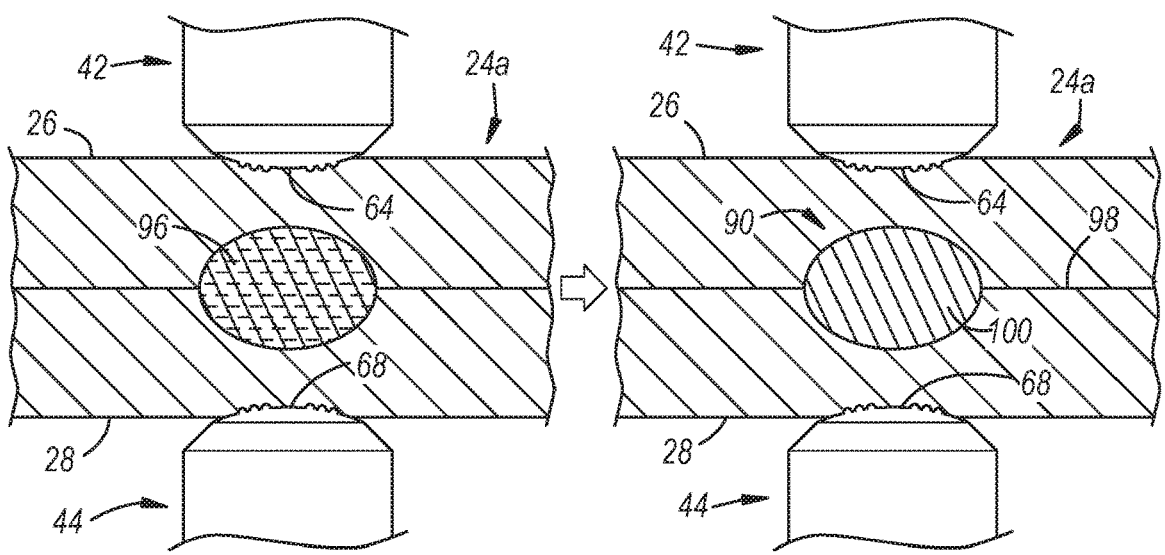
FIG. 6 is a representative depiction of a workpiece stack-up showing the formation of an aluminum-to-aluminum spot weld using welding electrodes constructed as illustrated in FIGS. 4-5 according to practices of the first embodiment of the disclosed method.
Figure 7:
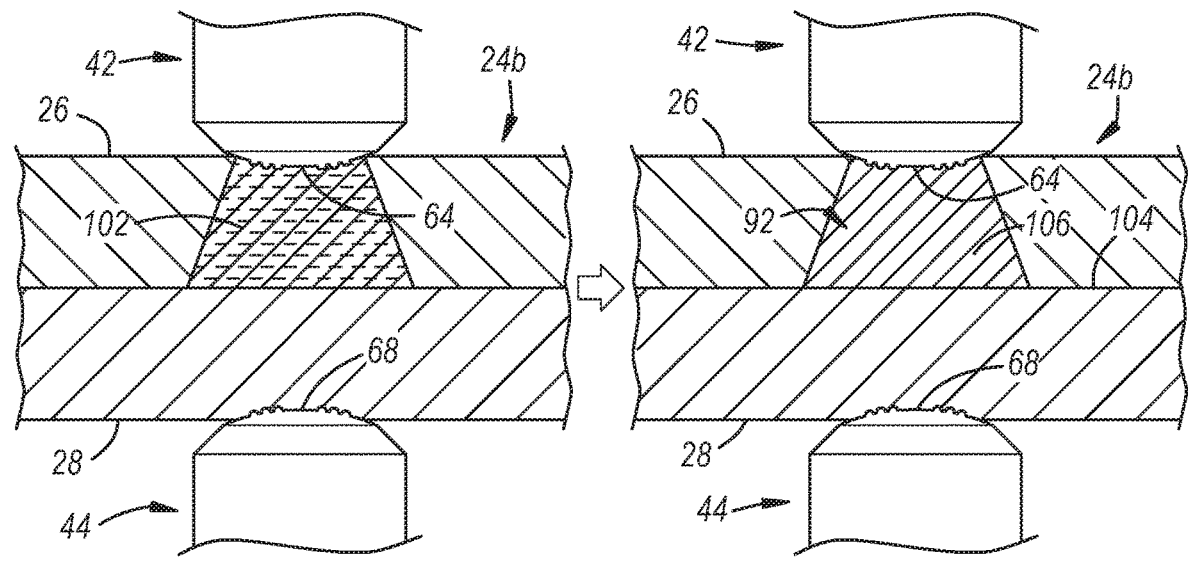
FIG. 7 is a representative depiction of a workpiece stack-up showing the formation of an aluminum-to-steel spot weld using welding electrodes constructed as illustrated in FIGS. 4-5 according to practices of the first embodiment of the disclosed method.
Figure 8:
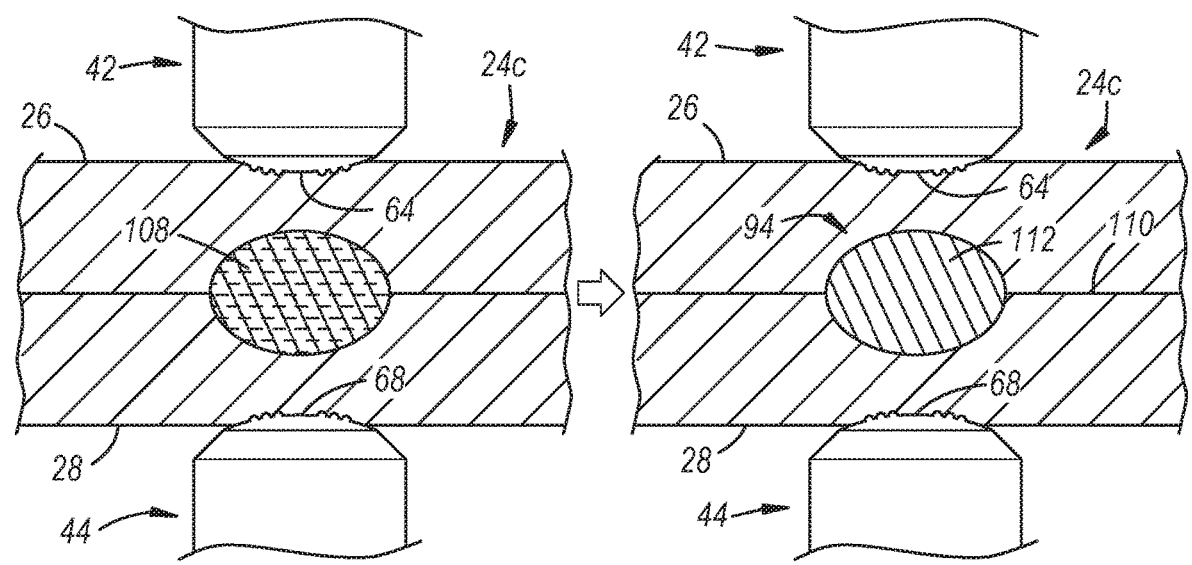
FIG. 8 is a representative depiction of a workpiece stack-up showing the formation of a steel-to-steel spot weld using welding electrodes as constructed illustrated in FIGS. 4-5 according to practices of the first embodiment of the disclosed method.

The weld gun 40 is progressed through the fixture of precisely positioned vehicle body members to each designated workpiece stack-up 24 in a specific sequence in order to form the many planned spot welds needed to structurally support the multi-component integrated body-in-white assembly 10. The progression of the weld gun 40 is depicted generally in FIGS. 6-8. First, as shown in FIG. 6, the workpiece stack-ups 24 that include two or more aluminum workpieces, which are collectively identified by reference numeral 24a, are spot welded to from a first set of aluminum-aluminum spot welds 90. Second, as shown in FIG. 7, the workpiece stack-ups 24 that include an aluminum workpiece and adjacent steel workpiece, which are collectively identified by reference numeral 24b, are spot welded to form a second set of aluminum-steel spot welds 92. And third, as shown in FIG. 8, the workpiece stack-ups 24 that include two or more steel workpieces, which are collectively identified by reference numeral 24c, are spot welded to form a third set of steel-steel spot welds 94. The weld gun 40 can be configured so that each spot weld 90, 92, 94 is formed according to its own unique weld schedule depending on the gauge, workpiece substrate composition, workpiece surface coating composition, stack-up thickness, etc.

Referring now to FIG. 6, the formation of each aluminum-to-aluminum spot weld 90 begins by pressing the weld face 64 of the first welding electrode 42 and the weld face 68 of the second welding electrode 44 against the first side 26 and the second side 28, respectively, of the workpiece stack-up 24a at the weld site WS under an imposed clamping force. The force applied by the welding electrodes 42, 44 typically ranges from 600 lb to 1300 lb. Once the welding electrodes 42, 44 are pressed in place, an electrical current is passed between the facially-opposed weld faces 64, 68 and through the workpiece stack-up 24a across each faying interfaces 98. The passing electrical current flow generates heat and creates a molten aluminum weld pool 96 that consumes the faying interface(s) 98 established between each adjacent pair of aluminum workpieces at the weld site WS within the stack-up 24a. The molten aluminum weld pool 96 extends through all or part of each of the aluminum workpieces and, upon ceasing passage of the electrical current, solidifies into an aluminum weld nugget 100 that fusion welds the aluminum workpieces together. And while any suitable weld schedule may be employed to carry out formation of the aluminum-to-aluminum spot welds 90, a particularly preferred weld schedule is disclosed in U.S. Pat. Pub. No. 2013/0048613, the entire contents of which are incorporated herein by reference.

The structure of the aluminum weld nugget 100 formed within the workpiece stack-up(s) 24a at each weld site WS is essentially the same regardless of the number of overlapping aluminum workpieces that are present within the stack-up 24a. If only two overlapping aluminum workpieces are present at the weld site WS, the aluminum-to-aluminum spot weld 90 comprises a single aluminum weld nugget 100 that penetrates partially into each of the overlapping aluminum workpieces. If three or four overlapping aluminum workpieces are present at the weld site WS, the aluminum-to-aluminum spot weld 90 still comprises a single aluminum weld nugget 100, although in these situations the nugget 100 fully penetrates the interior aluminum workpiece(s) and extends partially into the flanking outer aluminum workpieces. Notwithstanding the number of overlapping aluminum workpieces in each of the many workpieces stack-up 24a that are subjected to spot welding, the first set of aluminum-to-aluminum spot welds 90 formed throughout the eventual multi-component integrated body-in-white assembly 10 by the weld gun 40 may constitute anywhere from 2 to 40 spot welds 90.

Referring now to FIG. 7, the formation of each aluminum-to-steel spot weld 92 also begins by pressing the weld face 64 of the first welding electrode 42 and the weld face 68 of the second welding electrode 44 against the first side 26 and the second side 28, respectively, of the workpiece stack-up 24b at the weld site WS under an imposed clamping force. The force applied by the welding electrodes 42, 44 typically ranges from 600 lb to 1300 lb. Once the welding electrodes 42, 44 are pressed in place, an electrical current is passed between the facially-opposed weld faces 64, 68 and through the workpiece stack-up 24b. The passing electrical current flow generates heat and creates a molten aluminum weld pool 102 within the aluminum workpiece that lies adjacent to the steel workpiece. The molten aluminum weld pool 102 wets the adjacent steel workpiece, which does not contribute molten material to the weld pool 102, and penetrates into aluminum workpiece, typically to a distance of 20% to 100% of its thickness, from a faying interface 104 established between the aluminum and steel workpieces. Upon ceasing passage of the electrical current, the molten aluminum weld pool 102 solidifies into an aluminum weld joint 106 that weld bonds or brazes the aluminum and steel workpieces together. And while any suitable weld schedule may be employed to carry out formation of the aluminum-to-steel spot welds 92, a particularly preferred weld schedule is disclosed in U.S. application Ser. No. 14/883,249, the entire contents of which are incorporated herein by reference.

The structure of the aluminum weld joint 106 formed within the workpiece stack-up(s) 24b at each weld site WS is essentially the same at the faying interface 104 regardless of whether any additional metal workpieces are included in the stack-up 24b. If any additional faying interfaces—i.e., interfaces besides of the faying interface 104 established between the aluminum and steel workpieces—are established within the workpiece stack-up 24b, such as between two aluminum workpieces and/or between two steel workpieces, then an additional weld nugget may or may not be formed as part of the aluminum-to-steel spot weld 92. Specifically, if one or more aluminum workpieces are included in the workpiece stack-up 24b, the aluminum weld joint 106 simply extends through the additional overlapping aluminum workpieces. If, however, one or more steel workpieces are included in the workpiece stack-up 24b, a separate steel weld nugget (similar to that described below) may form within the steel workpieces in addition to the aluminum weld joint 106. Regardless of whether one or more additional workpieces (aluminum and/or steel) are included along with the adjacent aluminum and steel workpieces in each of the many workpieces stack-up 24b that are subjected to spot welding, the second set of aluminum-to-steel spot welds 92 formed throughout the eventual multi-component integrated body-in-white assembly 10 by the weld gun 40 may constitute anywhere from 2 to 40 spot welds 92.

Referring now specifically to FIG. 8, the formation of each steel-to-steel spot weld 94 begins, like before, by pressing the weld face 64 of the first welding electrode 42 and the weld face 68 of the second welding electrode 44 against the first side 26 and the second side 28, respectively, of the workpiece stack-up 24c at the weld site WS under an imposed clamping force. The force applied by the welding electrodes 42, 44 typically ranges from 400 lb to 1500 lb. Once the welding electrodes 42, 44 are pressed in place, an electrical current is passed between the facially-opposed weld faces 64, 68 and through the workpiece stack-up 24c across each faying interface 110. The passing electrical current flow generates heat and creates a molten steel weld pool 108 that consumes the faying interface(s) 110 established between each adjacent pair of steel workpieces within the stack-up 24c. The molten steel weld pool 108 extends through all or part of each of the steel workpieces and, upon ceasing passage of the electrical current, solidifies into a steel weld nugget 112 that fusion welds the steel workpieces together. Any suitable weld schedule may be employed to carry out formation of the steel-to-steel spot welds 94.

The structure of the steel weld nugget 112 formed within the workpiece stack-up(s) 24c at each weld site WS is essentially the same regardless of the number of overlapping steel workpieces that are present within the stack-up 24c. If only two overlapping steel workpieces are present at the weld site WS, the steel-to-steel spot weld 94 comprises a single steel weld nugget 112 that penetrates into each of the overlapping steel workpieces. If three or four overlapping steel workpieces are present at the weld site WS, the steel-to-steel spot weld 94 still comprises a single steel weld nugget 112, although in these situations the nugget 112 fully penetrates the interior steel workpiece(s) and extends into the flanking outer steel workpieces. Notwithstanding the number of overlapping steel workpieces in each of the many workpieces stack-up 24c that are subjected to spot welding, the third set of steel-to-steel spot welds 94 formed throughout the eventual multi-component integrated body-in-white assembly 10 by the weld gun 40 may constitute anywhere from 2 to 40 spot welds 94.

The first, second, and third sets of spot welds 90, 92, 94 are formed in the sequence set forth above primarily because of the different ways the first and second weld faces 64, 68

(MRD design) affect current flow through aluminum and steel workpieces as well as the degradation mechanisms the weld faces 64, 68 experience. In particular, the series of upstanding circular ridges 82 (FIGS. 4-5) can stretch and fracture the mechanically tough and electrically insulating refractory oxide surface layer that often coats the surface of an aluminum substrate of an aluminum workpiece, leading to the mechanical breakdown of the oxide layer, which helps establish good mechanical, electrical, and thermal contact between the weld faces 64, 68 and the bulk aluminum substrate of the aluminum workpiece. The ridges 82 do not have any particular function when brought into contact with a steel workpiece and, in fact, are quickly plastically deformed and flattened, but not entirely eliminated, at the temperatures achieved in the steel workpiece during welding. The domed shape of the weld faces 64, 68 is the feature that enables the welding electrodes 42, 44 to concentrate current and heat within a steel workpiece as needed to form aluminum-to-steel and steel-to-steel spot welds 92, 94. As such, in order to make effective use of the series of upstanding circular ridges 82 originally present on each weld face 64, 68, all of the aluminum-to-aluminum spot welds 90 are formed first and all of the steel-to-steel spot welds 94 are formed last.

Another factor that supports forming the first, second, and third sets of spot welds 90, 92, 94 in that order is the potential reaction of the welding electrodes 42, 44 with the steel workpieces. To be sure, when the first and second weld faces 64, 68 are brought to bear against a steel workpiece, especially a galvanized steel workpiece, the copper in the weld faces 64, 68 may react with zinc in the surface layer (if present) of the steel workpiece to form a copper-zinc alloy that can accelerate macro-deformation (e.g., mushrooming) of the weld face 64, 68. In addition, zinc contamination, including oxides, can build up on the base weld face surface 80 and becomes trapped between the upstanding circular ridges 82 of each welding electrode 42, 44. The combination of reduced ridge height 82$h$, caused by flattening of the ridges 82 against the steel workpiece, along with zinc contamination has the effect of increasing workpiece contact resistance if the electrodes 42, 44 are subsequently used to spot weld aluminum workpieces. Increased contact resistance can result in excessive overheating of the aluminum workpieces at the electrode/workpiece junctions, which causes surface expulsion and degraded weld quality. Therefore, it is preferred to complete all of the aluminum-to-aluminum spot welds 90 first, using undeformed and uncontaminated weld faces 62, 64, and all of the steel-to-steel spot welds 94 last, to ensure good weld quality as well as limit the transfer of iron-containing contaminants to the aluminum workpieces that can cause galvanic corrosion and premature aluminum workpiece deterioration.

Figure 9:
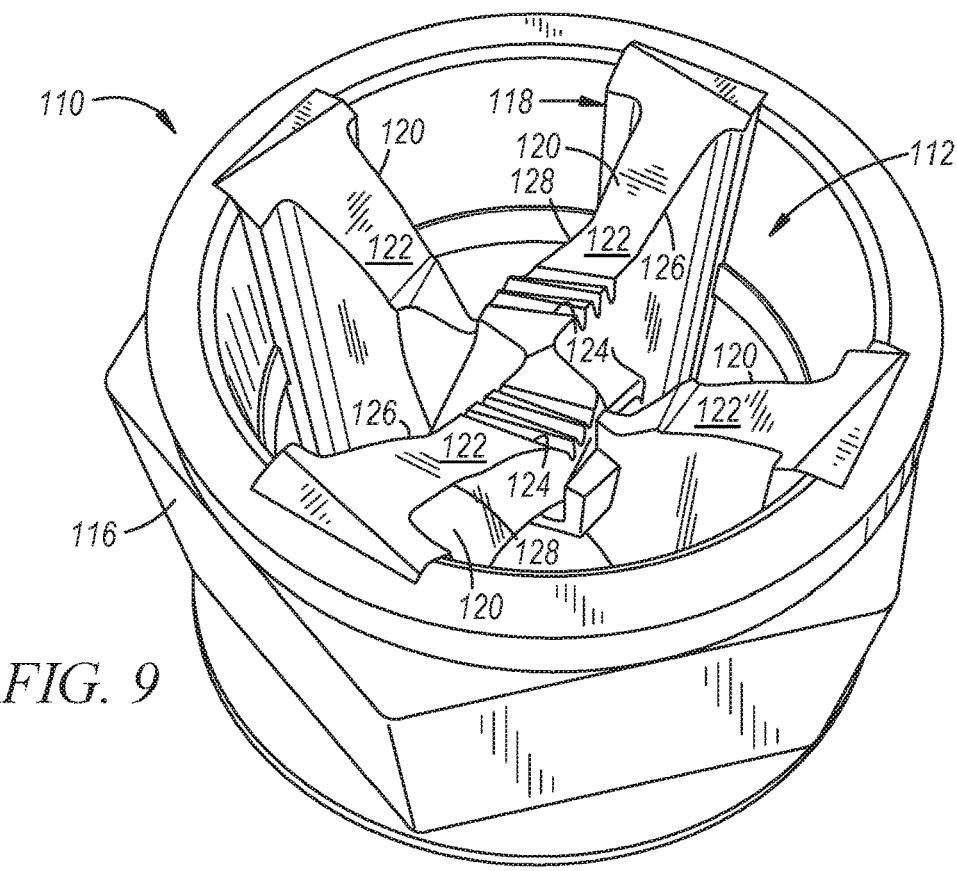
FIG. 9 is a perspective view of a cutting tool that includes a cutting socket for restoring the weld face of a welding electrode constructed as illustrated in FIGS. 4-5 according to a first embodiment of the disclosed method.
Figure 10:
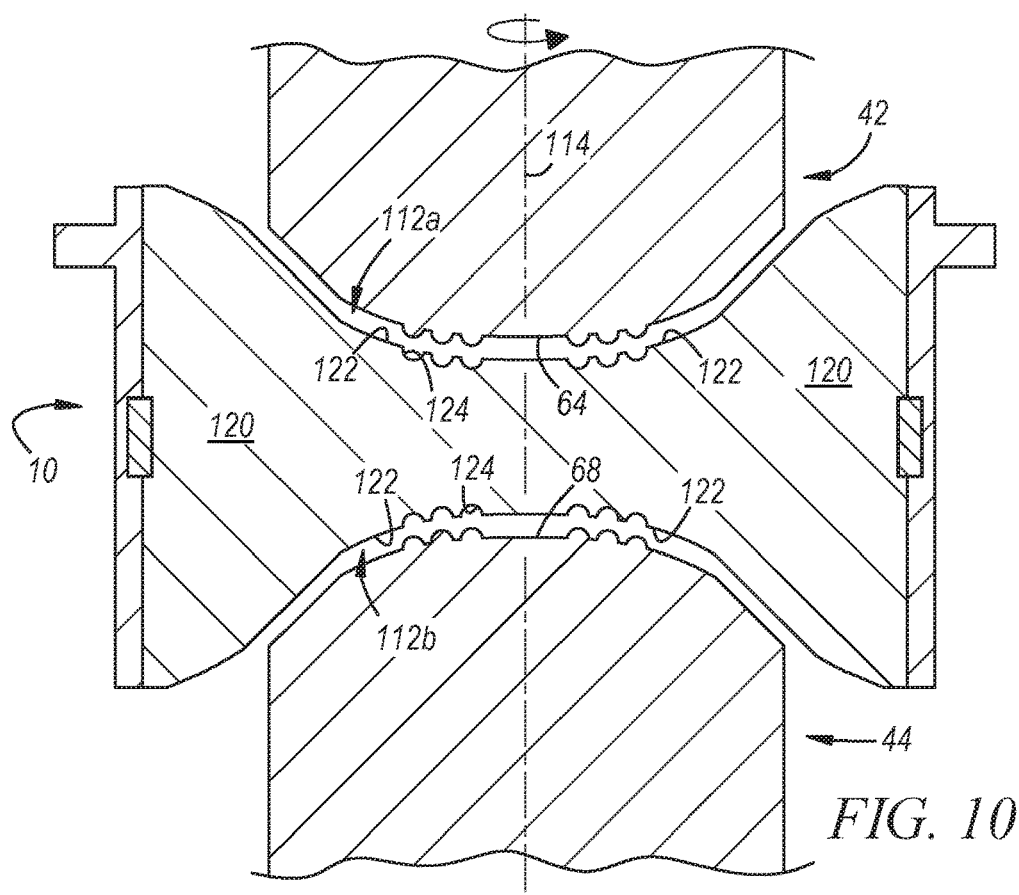
FIG. 10 is a cross-sectional view of a cutting tool that includes a first cutting socket and a second cutting socket so that two opposed welding electrodes having the construction illustrated in FIGS. 4-5 can be restored simultaneously during rotation of the cutting tool according to a first embodiment of the disclosed method.

After the weld gun 40 has progressed through its patterned movement relative to the fixture of vehicle body members and formed the first, second, and third sets of spot welds 90, 92, 94, in that order, each of the first and second weld faces 64, 68 is preferably restored to regenerate their original shape and geometries, including its series of upstanding circular ridges 82, in preparation for the next progression through the scheduled sequence of spot welds. With reference now to FIGS. 9-10, such restoration involves the use of a cutting tool 110 to perform a redressing operation. The cutting tool 110 includes a cutting socket 112 configured to shear off a depth of weld face material and to re-cut a new series of upstanding circular ridges 82 into the weld face upon being rotated about an axis of rotation 114 (FIG. 10) of the cutting tool 110 when engaged with the weld face. As shown best in FIG. 9, the cutting tool 110 includes a body 116 and a cutting member 118 surrounded by the body 116. The cutting member 118 includes at least one cutting flute 120, and preferably four as shown, having a cutting surface 122 at an exposed axial end. The cutting surface(s) 122 are curved in complimentary conformance to the desired convexly domed profile of the weld face and at least one, and preferably two, of the cutting surfaces 122 defines recessed grooves 124 that extend from a leading edge 126 towards a trailing edge 128. The recessed grooves 124 may be curved as they extend across the cutting surface 122 or, alternatively, they may extend straight across at a rake angle that offers the necessary clearance behind the leading edge 126.

Each of the first and second weld faces 64, 68 is redressed by, first, being inserted into the cutting socket 112 such that the weld face 64, 68 being redressed engages the cutting surface(s) 122 under pressure. When so inserted, the axis 84 (referring to FIGS. 4-5) of the weld face 64, 68 is aligned with the axis of rotation 114 of the cutting tool 110. Next, the cutting tool 110 is rotated on its axis 114 while remaining forcibly engaged with the weld face 64, 68, typically completing anywhere from 1 to 10, or more narrowly 4 to 6, full rotations at a speed of 100 rpm to 1000 rpm, or more narrowly 200 rpm to 500 rpm. As the cutting tool 110 is rotated, the leading edge 126 of the cutting surface(s) 122 shears away weld face material and reestablishes the original diameter and convexly domed shape of the weld face 64, 68 while the recessed grooves 124 fashion the new series of upstanding circular ridges 82. Each of the recessed grooves 124 fashions an upstanding circular ridge 82 in a corresponding location on the weld face 64, 68 and, consequently, the number of recessed grooves 124 included in the cutting surface(s) 122 is equal to the number of upstanding circular ridges 82 cut into the weld face 64, 68. The shearing action of the cutting surface(s) 122 shears away weld face material to a depth between 10 µm an 500 µm, or more narrowly between 50 µm and 200 µm, over the course of the redressing operation.

The first and second weld faces 64, 68 may be redressed simultaneously in the same cutting tool, as illustrated in FIG. 10. There, it can be seen that the cutting tool 110 includes two cutting sockets 112 exposed at opposite axial ends of the tool 110. The two cutting sockets 112, more specifically, include a first cutting socket 112$a$ and a second cutting socket 112$b$. The first weld face 64 of the first welding electrode 42 may be inserted into the first cutting socket 112$a$ and the second weld face 68 of the second welding electrode 44 may be inserted into the second cutting socket 112$b$. In this way, when the cutting tool 110 is rotated about its axis of rotation 114, the first and second weld faces 64, 68 are simultaneously redressed as described above. Such redressing of the weld faces 64, 68 can even be performed without removing either of the welding electrodes 42, 44 from the weld gun 40, which helps make the redressing process as efficient as possible. Of course, in an alternative implementation, the first and second weld faces 64, 68 may be redressed at separate times by the same or a different cutting tool 110 depending on the practicalities or other constraints of the manufacturing setting in which the weld gun 40 operates.

The redressing of the first and second weld faces 64, 68 may be carried out in this embodiment after the third set of steel-to-steel spot welds 94 are formed to restore the welding electrodes 42, 44 for another progression through the spot welding sequence as part of the manufacture of another multi-component integrated body-in-white assembly 10.

The redressing of the weld faces 64, 68, however, is not limited solely to that occasion, as the same redressing operation may be performed at any time the weld faces 64, 68 are desired to be restored. For example, if the number of aluminum-to-aluminum spot welds 90 required to be formed in the first set is relatively large, then it may be desired to redress the first and second weld faces 64, 68 after the performance of one or more subsets of the first set of aluminum-to-aluminum spot welds 90 to ensure the series of upstanding circular ridges 82 is maintained and available to complete the first set of aluminum-to-aluminum spot welds 90. As another example, the number of aluminum-to-steel spot welds 92 and/or steel-to-steel spot welds 94 may be relatively low such that more than one progression through the spot welding sequence is possible without the need to restore the weld faces 42, 44 of the welding electrodes 64, 68. In any event, because weld face material is removed during each redressing operation, regardless of when redressing is practiced, the first and second welding electrodes 42, 44 will eventually have to be replaced on the weld gun 40 with new welding electrodes. The welding electrodes 42, 44 can typically be redressed 20 to 80 times before the cumulative removal of weld face material warrants their replacement.

The first embodiment of the disclosed method as described thus far has focused primarily on the construction of a multi-component integrated assembly in which workpiece stack-ups of having the following combinations of metal workpieces are subjected to resistance spot welding: (1) workpiece stack-ups that include two or more aluminum workpieces, (2) workpiece stack-ups that include an aluminum workpiece and an adjacent a steel workpiece, and (3) workpiece stack-ups that include two or more steel workpieces. In that scenario, as discussed above, the spot welding sequence calls for forming the first set of aluminum-to-aluminum spot welds 90, the second set of aluminum-to-steel spot welds 92, and the third set of steel-to-steel spot welds 94, in that order, while restoring the weld faces 64, 68 as needed by way of redressing to regenerate their original shapes and geometries in accordance with the MRD electrode design. The disclosed method, however, is not necessarily limited only to those circumstances in which all three types of spot welds 90, 92, 94 need to be formed.

The disclosed method of resistance spot welding different combinations of metal workpieces can, in fact, be practiced with any grouping of two of the following combinations of metal workpieces: (1) workpiece stack-ups that include two or more aluminum workpieces, (2) workpiece stack-ups that include an aluminum and an adjacent steel workpiece, and (3) workpiece stack-ups that include two or more steel workpieces. Whichever two types of workpiece stack-ups are in need of spot welding during construction of a multi-component integrated assembly, such as a body-in-white, the same sequence of spot welding is retained for those workpiece stack-ups that are present. That is, any aluminum-to-aluminum spot welds 90 (if needed) are formed first, any aluminum-to-steel spot welds 92 (if needed) are formed next, and any steel-to-steel spot welds 94 (if needed) are formed last, with redressing of the weld faces 64, 68 after completion of the spot welding sequence being a possibility.

In a specific alternative implementation of the disclosed method, the fixture of vehicle body members contains workpiece stack-ups 24a that include two or more aluminum workpieces and workpiece stack-ups 24b that include an aluminum workpiece and an adjacent steel workpiece, each of which needs to be spot welded during construction of the multi-component integrated body-in-white assembly 10. The fixture of vehicle body members does not contain—at least for purposes of welding with the same weld gun 40—any workpiece stack-ups 24c that include two or more overlapping steel workpieces. Thus, according to practices of the disclosed method, the weld gun 40 is progressed through the fixture of vehicle body members to each of the designated workpiece stack-ups 24 in a specific sequence so that the set of the aluminum-to-aluminum spot welds 90 is formed first (FIG. 6) and the set of the aluminum-to-steel spot welds 92 is (FIG. 7) formed afterwards. Once the aluminum-to-aluminum and the aluminum-to-steel spot welds 90, 92 have been formed as part of structurally securing together the multi-component integrated body-in-white assembly 10, the weld faces 64, 68 of the first and second welding electrodes 42, 44 may be redressed with a cutting tool (FIGS. 9-10).

In another alternative implementation of the disclosed method, the fixture of vehicle body members contains workpiece stack-ups 24b that include an aluminum workpiece and an adjacent steel workpiece and workpiece stack-ups 24c that include two or more overlapping steel workpieces, each of which needs to be spot welded during construction of the multi-component integrated body-in-white assembly 10. The fixture of vehicle body members does not contain—at least for purposes of welding with the same weld gun 40—any workpiece stack-ups 24a that include two or more overlapping aluminum workpieces. Thus, according to practices of the disclosed method, the weld gun 40 is progressed through the fixture of vehicle body members to each of the designated workpiece stack-ups 24 in a specific sequence so that the set of the aluminum-to-steel spot welds 92 is formed first (FIG. 7) and the set of the steel-to-steel spot welds 94 is (FIG. 8) formed afterwards. Once the aluminum-to-steel and the steel-to-steel spot welds 92, 94 have been formed as part of structurally securing together the multi-component integrated body-in-white assembly 10, the weld faces 64, 68 of the first and second welding electrodes 42, 44 may be redressed with a cutting tool (FIGS. 9-10).

In still another alternative implementation of the disclosed method, the fixture of vehicle body members contains workpiece stack-ups 24a that include two or more aluminum workpieces and workpiece stack-ups 24c that include two or more steel workpieces, each of which needs to be spot welded during construction of the multi-component integrated body-in-white assembly 10. The fixture of vehicle body members does not contain—at least for purposes of welding with the same weld gun 40—any workpiece stack-ups 24b that include an aluminum workpiece and an adjacent steel workpiece. Thus, according to practices of the disclosed method, the weld gun 40 is progressed through the fixture of vehicle body members to each of the designated workpiece stack-ups 24 in a specific sequence so that the set of the aluminum-to-aluminum spot welds 90 are formed first (FIG. 6) and the set of the steel-to-steel spot welds 94 are (FIG. 8) formed afterwards. Once the aluminum-to-aluminum and the steel-to-steel spot welds 90, 94 have been formed as part of structurally securing together the multi-component integrated body-in-white assembly 10, the weld faces 64, 68 of the first and second welding electrodes 42, 44 may be redressed with a cutting tool (FIGS. 9-10).

Figure 11:
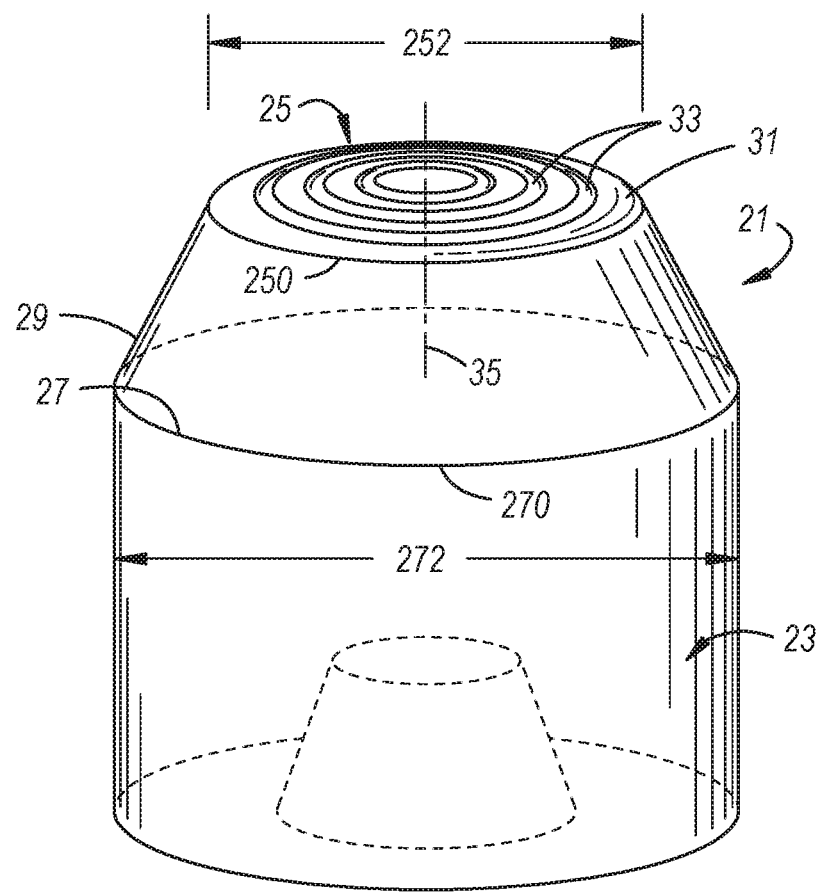
FIG. 11 is a perspective view of a welding electrode that embodies a particular electrode design (the grooved welding electrode design) and that represents the structure of each of the opposed welding electrodes carried by the weld gun shown in FIG. 3 according to a second embodiment of the disclosed method.
Figure 12:
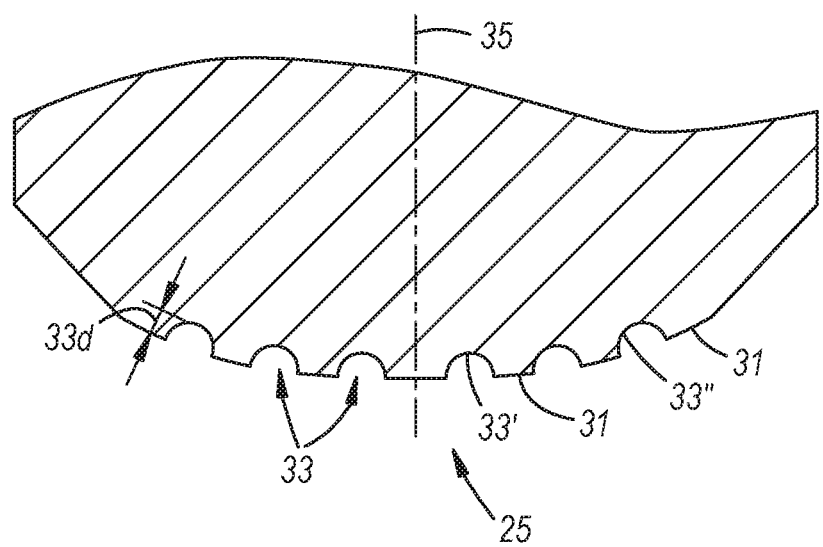
FIG. 12 is a magnified cross-sectional view of the weld face of the particular welding electrode illustrated in FIG. 11.

A second embodiment of the disclosed method of the present disclosure is described in connection with FIGS. 11-12 and is similar in many ways to the first embodiment described above. Indeed, FIGS. 1-3 and the discussion above relating to those Figures are equally applicable to and incorporated into the second embodiment and, therefore, a duplicative description of those Figures does not need to be provided here. The primary distinction between the second embodiment and the previously-described first embodiment is the design of the weld faces of the welding electrodes. Specifically, in this embodiment, the oxide-disrupting structural features included on the weld face of each of the welding electrodes is a series of recessed circular grooves. In the descriptions of the Figures that follow, like reference numerals are used to denote like structural features that have similar structure and like function to those corresponding features of the first embodiment of the disclosed method.

Figure 13:
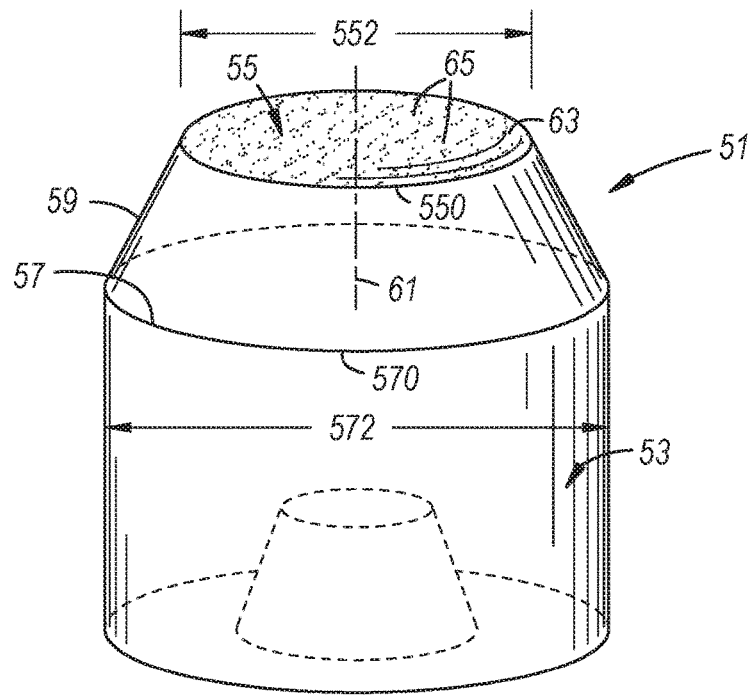
FIG. 13 is a perspective view of a welding electrode that embodies a particular electrode design (the micro-textured welding electrode design) and that represents the structure of each of the opposed welding electrodes carried by the weld gun shown in FIG. 3 according to a third embodiment of the disclosed method.

In this embodiment, and referring for the moment back to FIG. 3, each of the first and second welding electrodes 42, 44 that is carried by the first weld gun 40 is constructed as a grooved welding electrode and is formed of an electrically conductive material such as any of the materials disclosed in connection with the description of the MRD electrode of the previous embodiment. Like before, the first welding electrode 42 includes an electrode body 62 and a first weld face 64 and, likewise, the second welding electrode 44 includes an electrode body 66 and a second weld face 68. The specific structural features and dimensions of the electrode bodies 62, 66 and the weld faces 64, 68 of the first and second welding electrodes 42, 44 as dictated by the grooved electrode design are illustrated in more detail in FIGS. 11-12. In those Figures, the first and second welding electrodes 42, 44 are represented by a welding electrode identified by reference numeral 21 that has an electrode body 23 and a weld face 25. The descriptions of the electrode body 23 and the weld face 25 of the welding electrode 21 shown in FIG. 13 is thus applicable to the electrode bodies 62, 66 and the weld faces 64, 68 of the first and second welding electrodes 42, 44 shown in FIG. 3.

The electrode body 23 of the grooved welding electrode 21 is preferably cylindrical in shape and includes a front end 27 having a circumference 270. A diameter 272 of the body 23 taken at the circumference 270 of its front end 27 preferably lies within the range of 12 mm to 22 mm or, more narrowly, within the range of 16 mm to 20 mm. The weld face 25 is disposed on the front end 27 of the body 23 and has a circumference 250 that is coincident with the circumference 270 of the front end 27 of the body 23 (a "full face electrode") or is upwardly displaced from the circumference 270 of the front end 27, to a distance between 2 mm and 10 mm, by a transition nose 29 of frustoconical or truncated spherical shape. If the transition nose 29 is frustoconical, the angle of truncation is preferably between 30° and 60° from a horizontal plane of the weld face circumference 250. If the transition nose 29 is spherical, the radius of curvature of the transition nose 29 preferably ranges from 6 mm to 12 mm.

The weld face 25 of the grooved welding electrode 21 preferably has a diameter 252 measured at its circumference 250 that lies within the range of 6 mm to 22 mm or, more narrowly, within the range of 8 mm to 15 mm. In terms of its shape, the weld face 25 includes a base weld face surface 31 that is convexly domed. As such, the base weld face surface 31 ascends upwards from the circumference 250 of the weld face 25 in narrowing fashion. For instance, in one particular version, the base weld face surface 31 may be spherically-shaped (i.e., it is a portion of a sphere) with a radius of curvature that lies within the range of 15 mm to 300 mm or, more narrowly, within the range of 20 mm to 50 mm. The weld face 25 also includes a series of recessed circular grooves 33 that intrude inwardly from the base weld face surface 31. Under the relatively high pressures imposed on the welding electrode 21 during spot welding, these recessed circular grooves 33 enable the grooved welding electrode 21 to establish good mechanical and electrical contact with an aluminum workpiece surface by stressing and fracturing the mechanically tough and electrically insulating refractory oxide layer that is typically present in an aluminum workpiece over the aluminum substrate, yet they do not materially interfere with current communication into and through a steel workpiece, in much the same way as the MRD electrode design of the previous embodiment.

The series of recessed circular grooves 33 are preferably centered about and surround a central axis 35 of the weld face 25. The base weld face surface 31 from which the grooves 33 intrude inwardly may account for 50% or more, and preferably between 50% and 80%, of the total surface area of the weld face 25. The remaining surface area is attributed to the series of recessed circular grooves 33, which preferably includes anywhere from two ridges to ten grooves, or more narrowly from three to five grooves. When viewed from above in plan perspective, the several recessed circular grooves 33 are radially spaced apart from each other by annular portions of the base weld face surface 31 such that the recessed grooves 33 become larger in diameter when moving from an innermost recessed groove 33' that immediately surrounds the central axis 35 of the weld face 25 to an outermost recessed groove 33" that is farthest from the central axis 35 of the weld face 25 and, consequently, most proximate to the circumference 250 of the weld face 25 (FIG. 12).

The size and shape of the recessed circular grooves 33 are subject to some variability without sacrificing their dressability. In one version, as shown best in FIG. 11, each of the recessed circular grooves 33 has a closed circumference, meaning the groove 33 is continuously curved when viewed from above in plan perspective such that its circumference is not interrupted. Additionally, the cross-sectional profile of each groove 33 may lack that sharp corners and have a curved (as shown) or flat bottom surface. Moreover, as shown in FIG. 12, each of the circular grooves 33 also has a groove depth 33d—taken at the lowest point of the groove 33—that extends downwards from the base weld face surface 31 when viewed in cross-section. The groove depth 33d of each groove 33 preferably ranges from 20 μm to 400 μm or, more narrowly, from 50 μm to 300 μm. And the spacing of the grooves 33 as measured between the midpoints of two adjacent grooves 33 preferably ranges from 50 μm to 1800 μm or, more narrowly, from 80 μm to 1500 μm. Each of the recessed circular grooves 33 is preferably semicircular, truncated semicircular, or truncated triangular in cross-section.

Similar to the first embodiment of the disclosed method, the weld gun 40 in this embodiment is progressed through the fixture of precisely positioned vehicle body members to each designated workpiece stack-up 24 in a specific sequence in order to form the many planned spot welds needed to structurally support the multi-component integrated body-in-white assembly 10. And the way in which an aluminum-to-aluminum spot weld 90 (FIG. 6), an aluminum-to-steel spot weld 92 (FIG. 7), and a steel-to-steel spot weld 94 (FIG. 8) are formed by the momentary passage of an electrical current between the weld faces 64, 68 of the opposed welding electrodes 42, 44 is the same as described above for the first embodiment in connection with FIGS. 6-8. As such, the description of the aluminum-to-aluminum spot welds, the aluminum-to-steel spot welds, and the steel-to-steel spot welds as formed within their respective workpiece stack-ups during practices of the second embodiment using the grooved welding electrode need not be repeated here. What is more, the manner in which the weld face 25 of the grooved welding electrode 21 is restored to regenerate its original shape and geometries, including its series of recessed circular grooves 33, is identical in all material aspects to the manner in which the weld face of the MRD welding electrode is restored with the only difference being that the cutting surface (numeral 122 in FIG. 9) of the cutting flute(s) (numeral 120 in FIG. 9) define protruding ridges the extend from a leading edge (numeral 126 in FIG. 9) towards a trailing edge (numeral 128 in FIG. 9). The number of protruding ridges defined in the cutting surface(s) corresponds to the number of recessed grooves cut into the base weld face surface 31 of the weld face 25. Accordingly, a discussion of how the weld faces 46, 68 are restored in this embodiment need not be provided here given that the corresponding discussion in the first embodiment is virtually fully applicable here.

The redressing of the first and second weld faces 64, 68 may be carried out in this embodiment after the third set of steel-to-steel spot welds 94 are formed to restore the welding electrodes 42, 44 for another progression through the spot welding sequence as part of the manufacture of another multi-component integrated body-in-white assembly 10. The redressing of the weld faces 64, 68, however, is not limited solely to that occasion, as the same redressing operation may be performed at any time the weld faces 64, 68 are desired to be restored. For example, if the number of aluminum-to-aluminum spot welds 90 required to be formed in the first set is relatively large, then it may be desired to redress the first and second weld faces 64, 68 after the performance of one or more subsets of the first set of aluminum-to-aluminum spot welds 90 to ensure the series of recessed circular grooves 33 is maintained and available to complete the first set of aluminum-to-aluminum spot welds 90. As another example, the number of aluminum-to-steel spot welds 92 and/or steel-to-steel spot welds 94 may be relatively low such that more than one progression through the spot welding sequence is possible without the need to restore the weld faces 42, 44 of the welding electrodes 64, 68. In any event, because weld face material is removed during each redressing operation, regardless of when redressing is practiced, the first and second welding electrodes 42, 44 will eventually have to be replaced on the weld gun 40 with new welding electrodes. The welding electrodes 42, 44 can typically be redressed 20 to 80 times before the cumulative removal of weld face material warrants their replacement.

The second embodiment of the disclosed method as described thus far has focused primarily on the construction of a multi-component integrated assembly in which workpiece stack-ups of having the following combinations of metal workpieces are subjected to resistance spot welding: (1) workpiece stack-ups that include two or more aluminum workpieces, (2) workpiece stack-ups that include an aluminum workpiece and an adjacent steel workpiece, and (3) workpiece stack-ups that include two or more steel workpieces. In that scenario, as discussed above, the spot welding sequence calls for forming the first set of aluminum-to-aluminum spot welds 90 (FIG. 6), the second set of aluminum-to-steel spot welds 92 (FIG. 7), and the third set of steel-to-steel spot welds 94 (FIG. 8), in that order, while by restoring the weld faces 64, 68 as needed by way of redressing to regenerate their original shapes and geometries in accordance with the grooved electrode design. The disclosed method, however, is not necessarily limited only to those circumstances in which all three types of spot welds need to be formed. Rather, the second embodiment of the disclosed method can, in fact, be practiced with any grouping of two of the following combinations of metal workpieces in much the same way as the first embodiment: (1) workpiece stack-ups that include two or more aluminum workpieces, (2) workpiece stack-ups that include an aluminum and an adjacent steel workpiece, and (3) workpiece stack-ups that include two or more steel workpieces.

A third embodiment of the disclosed method of the present disclosure is described in connection with FIGS. 13-19 and is similar in many ways to the first and second embodiments described above. Indeed, FIGS. 1-3 and the discussion above relating to those Figures are equally applicable to and incorporated into the third embodiment and, therefore, a duplicative description of those Figures does not need to be provided here. The primary distinction between the third embodiment and the previously-described first and second embodiments is the design of the weld faces of the welding electrodes and the manner in which those weld faces are restored to regenerate their shapes and configurations. Specifically, in this embodiment, the oxide-disrupting structural features included on the weld face of each of the welding electrodes is a microtexture that comprises random three-dimensional peaks-and-valleys. In the descriptions of the Figures that follow, like reference numerals are used to denote like structural features that have similar structure and like function to those corresponding features in the previous first and second embodiments.

In this embodiment, and referring for the moment back to FIG. 3, each of the first and second welding electrodes 42, 44 that is carried by the first weld gun 40 is constructed as a microtextured welding electrode and is formed of an electrically conductive material such as any of the materials disclosed in connection with the description of the MRD electrode and the grooved electrode of the previous embodiments. Like before, the first welding electrode 42 includes an electrode body 62 and a first weld face 64 and, likewise, the second welding electrode 44 includes an electrode body 66 and a second weld face 68. The specific structural features and dimensions of the electrode bodies 62, 66 and the weld faces 64, 68 of the first and second welding electrodes 42, 44 as dictated by the microtextured electrode design are illustrated in more detail in FIG. 13. In that Figure, the first and second welding electrodes 42, 44 are represented by a welding electrode identified by reference numeral 51 that has an electrode body 53 and a weld face 55. The descriptions of the electrode body 53 and the weld face 55 of the welding electrode 51 shown in FIG. 13 is thus applicable to the electrode bodies 62, 66 and the weld faces 64, 68 of the first and second welding electrodes 42, 44 shown in FIG. 3.

The electrode body 53 of the microtextured welding electrode 51 is preferably cylindrical in shape and includes a front end 57 having a circumference 570. A diameter 572 of the body 53 taken at the circumference 570 of its front end 57 preferably lies within the range of 12 mm to 22 mm or, more narrowly, within the range of 16 mm to 20 mm. The weld face 55 is disposed on the front end 57 of the body 53 and has a circumference 550 that is coincident with the circumference 570 of the front end 57 of the body 53 (a "full face electrode") or is upwardly displaced from the circumference 570 of the front end 57, to a distance between 2 mm and 10 mm, by a transition nose 59 of frustoconical or truncated spherical shape. If the transition nose 59 is frustoconical, the angle of truncation is preferably between 30° and 60° from a horizontal plane of the weld face circumference 550. If the transition nose 59 is spherical, the radius of curvature of the transition nose 59 preferably ranges from 6 mm to 12 mm.

The weld face 55 of the microtextured welding electrode 51 preferably has a diameter 552 measured at its circumference 550 that lies within the range of 6 mm to 22 mm or, more narrowly, within the range of 8 mm to 15 mm. In terms of its shape, the weld face 55 has a central axis 61 and includes a base weld face surface 63 that is convexly domed about the central axis 61. As such, the base weld face surface 63 ascends upwards from the circumference 550 of the weld face 55 in narrowing fashion. For instance, in one particular version, the base weld face surface 63 may be spherically-shaped (i.e., it is a portion of a sphere) with a radius of curvature that lies within the range of 15 mm to 300 mm or, more narrowly, within the range of 20 mm to 50 mm. The base weld face surface 63 also includes a microtexture comprised of random three-dimensional microscopic peaks-and-valleys 65 covering at least 75% and, more preferably, between 90% and 100%, of the base weld face surface 61. The surface roughness of the base weld face surface 63 as provided by the microscopic peaks-and-valleys 65, as measured by the arithmetic average of the absolute values of profile height deviations from a mean line (i.e., Ra), preferably ranges from 2 μm to 50 μm or, more narrowly, from 5 μm to 10 μm.

The microtexture of the weld face 55 enables the weld face 55 to effectively fracture and penetrate the mechanically tough and electrically insulating refractory oxide layer that typically present in an aluminum workpiece over the aluminum substrate under the relatively high pressures imposed on the welding electrode 51 during spot welding. By penetrating through the refractory oxide layer, the weld face 55 is able to establish good mechanical, electrical, and thermal contact with the aluminum substrate of the aluminum workpiece that it engages. The aggregate effect of the microscopic peaks-and-valleys 65 spread across the base weld face surface 63 of the weld face 55 thus allows electrical current to be passed into and out of the aluminum workpiece without encountering high electrical resistance at the electrode/workpiece junction which, in turn, helps keep the weld face 55 from overheating during current flow. The microtexture of the weld face 55 does not materially interfere with or affect current communication into and through a steel workpiece.

Figure 14:
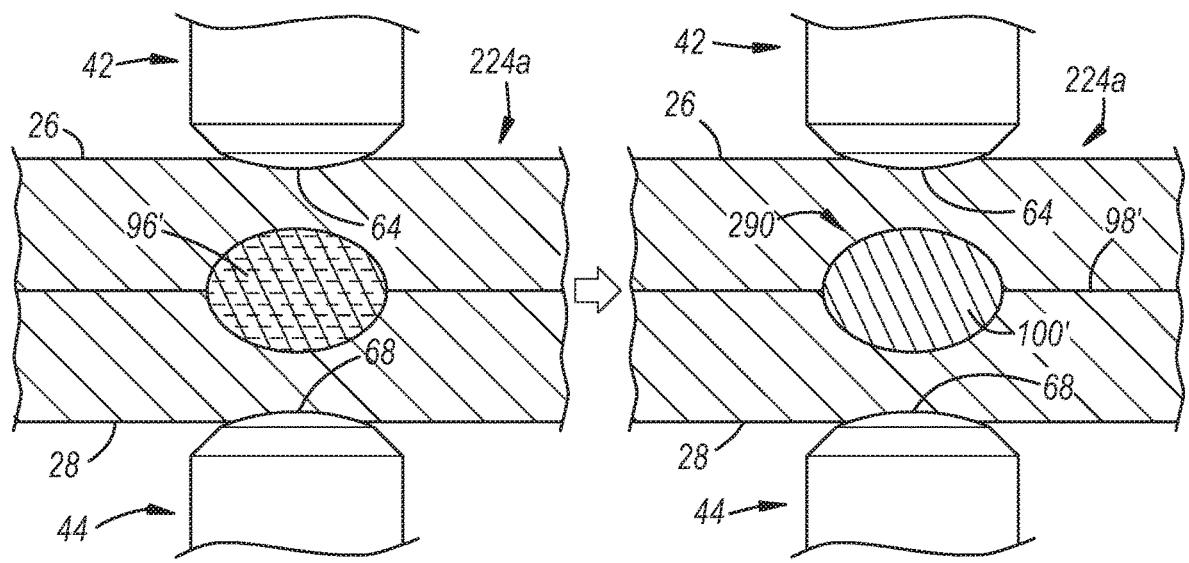
FIG. 14 is a representative depiction of a workpiece stack-up showing the formation of an aluminum-to-aluminum spot weld using welding electrodes constructed as illustrated in FIG. 13 according to practices of the third embodiment of the disclosed method.
Figure 15:
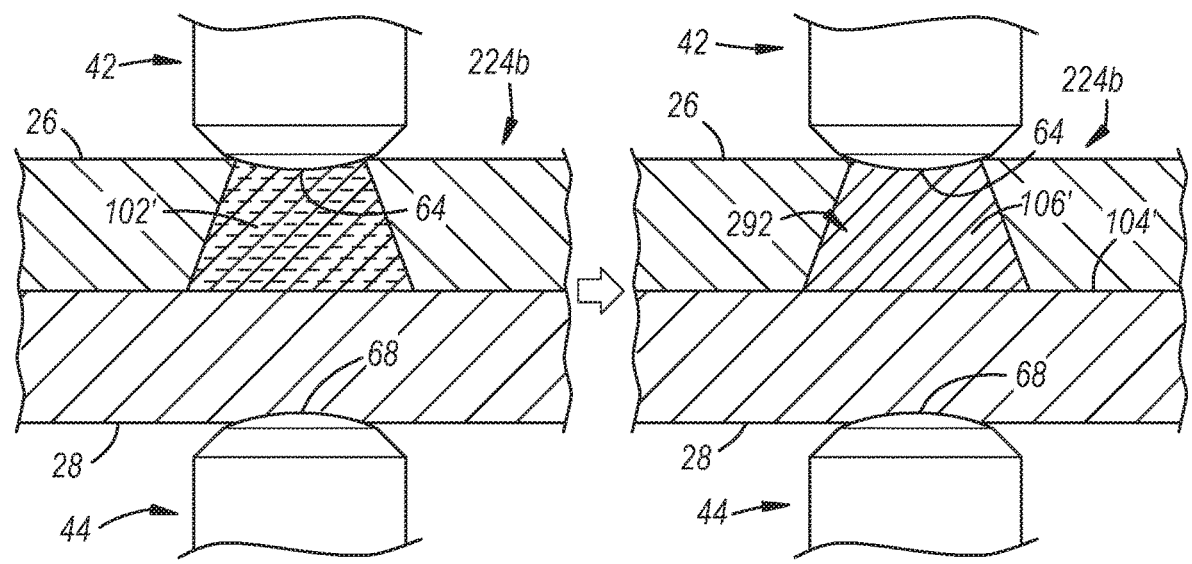
FIG. 15 is a representative depiction of a workpiece stack-up showing the formation of an aluminum-to-steel spot weld using welding electrodes constructed as illustrated in FIG. 13 according to practices of the third embodiment of the disclosed method.
Figure 16:
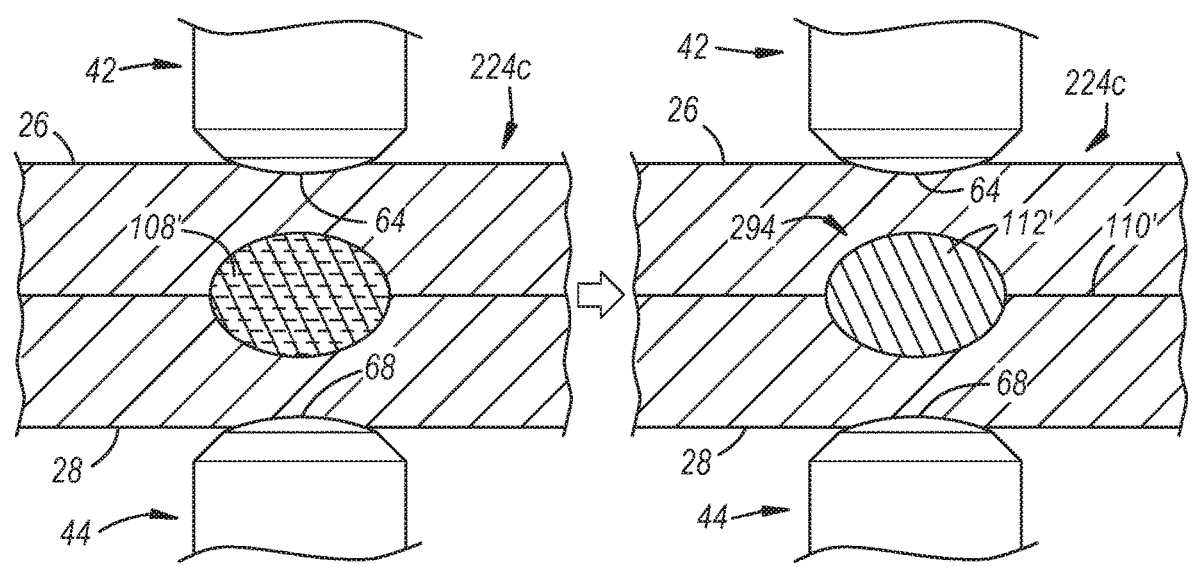
FIG. 16 is a representative depiction of a workpiece stack-up showing the formation of a steel-to-steel spot weld using welding electrodes constructed as illustrated in FIG. 13 according to practices of the third embodiment of the disclosed method.

Similar to the first and second embodiments of the disclosed method, the weld gun 40 in this embodiment is progressed through the fixture of precisely positioned vehicle body members to each designated workpiece stack-up 24 in a specific sequence in order to form the many planned spot welds needed to structurally support the multi-component integrated body-in-white assembly 10. The progression of the weld gun 40 is depicted generally in FIGS. 14-16. First, as shown in FIG. 14, the workpiece stack-ups 24 that include two or more aluminum workpieces, which are collectively identified by reference numeral 224a, are spot welded to from a first set of aluminum-aluminum spot welds 290. Second, as shown in FIG. 15, the workpiece stack-ups 24 that include a pair of adjacent aluminum and steel workpieces, which are collectively identified by reference numeral 224b, are spot welded to form a second set of aluminum-steel spot welds 292. And third, as shown in FIG. 16, the workpiece stack-ups 24 that include two or more steel workpieces, which are collectively identified by reference numeral 224c, are spot welded to form a third set of steel-steel spot welds 294. The weld gun 40 can be configured so that each spot weld 290, 292, 294 is formed according to its own unique weld schedule depending on the gauge, workpiece base substrate composition, workpiece surface coating composition, etc.

The way in which an aluminum-to-aluminum spot weld 290 (FIG. 14), an aluminum-to-steel spot weld 292 (FIG. 15), and a steel-to-steel spot weld 294 (FIG. 16) are formed by the momentary passage of an electrical current between the weld faces 64, 68 of the opposed welding electrodes 42, 44 is the same as described above for the first embodiment in connection with FIGS. 6-8. The structures of the spot welds 290, 292, 294 formed in workpiece stack-ups 224a, 224b, 224c of two or more workpieces are also the same as previously described. As such, the description of the aluminum-to-aluminum spot welds 290, the aluminum-to-steel spot welds 292, and the steel-to-steel spot welds 294 as formed within their respective workpiece stack-ups 224a, 224b, 224c need not be repeated here. Rather, the prime designation (') is used in FIGS. 12-14 in connection with various reference numerals to denote features that correspond to features identified by like reference numerals in FIGS. 6-8 and to indicate that the previous discussion of those particular features is equally applicable to and incorporated into this embodiment of the disclosed method. And, as before, each of the first set of aluminum-to-aluminum spot welds 290, the second set of aluminum-to-steel spot welds 292, and the third set steel-to-steel spot welds 294 may constitute anywhere from 2 to 40 spot welds that are formed throughout the eventual multi-component integrated body-in-white assembly 10 by the weld gun 40.

The first, second, and third sets of spot welds 290, 292, 294 are formed in the sequence set forth above primarily because of the different ways the first and second weld faces 64, 68 (microtextured design) affect current flow through aluminum and steel workpieces as well as the degradation mechanisms the weld faces 64, 68 experience. In particular, the microtexture of the weld faces 64, 68 can stretch, fracture, and penetrate through the mechanically tough and electrically insulating refractory oxide surface layer that often coats the surface of an aluminum substrate of an aluminum workpiece, leading to the mechanical breakdown of the oxide layer, which helps establish good mechanical, electrical, and thermal contact between the weld faces 64, 68 and the bulk aluminum substrate of the aluminum workpiece. The same microtexture does not have any particular function when brought into contact with a steel workpiece and, in fact, is quickly plastically deformed and smoothed out at the temperatures achieved in the steel workpiece during welding. The domed shape of the weld faces 64, 68 is what enables the welding electrodes 42, 44 to concentrate current and heat within a steel workpiece as needed to form aluminum-to-steel and steel-to steel spot welds 292, 294. As such, in order to make effective use of the microtexture originally present on each weld face 64, 68, all of the aluminum-to-aluminum spot welds 290 are formed first and all of the steel-to-steel spot welds 294 are formed last. The same reaction mechanisms experienced between the first and second weld faces 64, 68 and a steel workpiece described above in the first embodiment also support forming the first, second, and third sets of spot welds 290, 292, 294 in that order.

Figure 17:
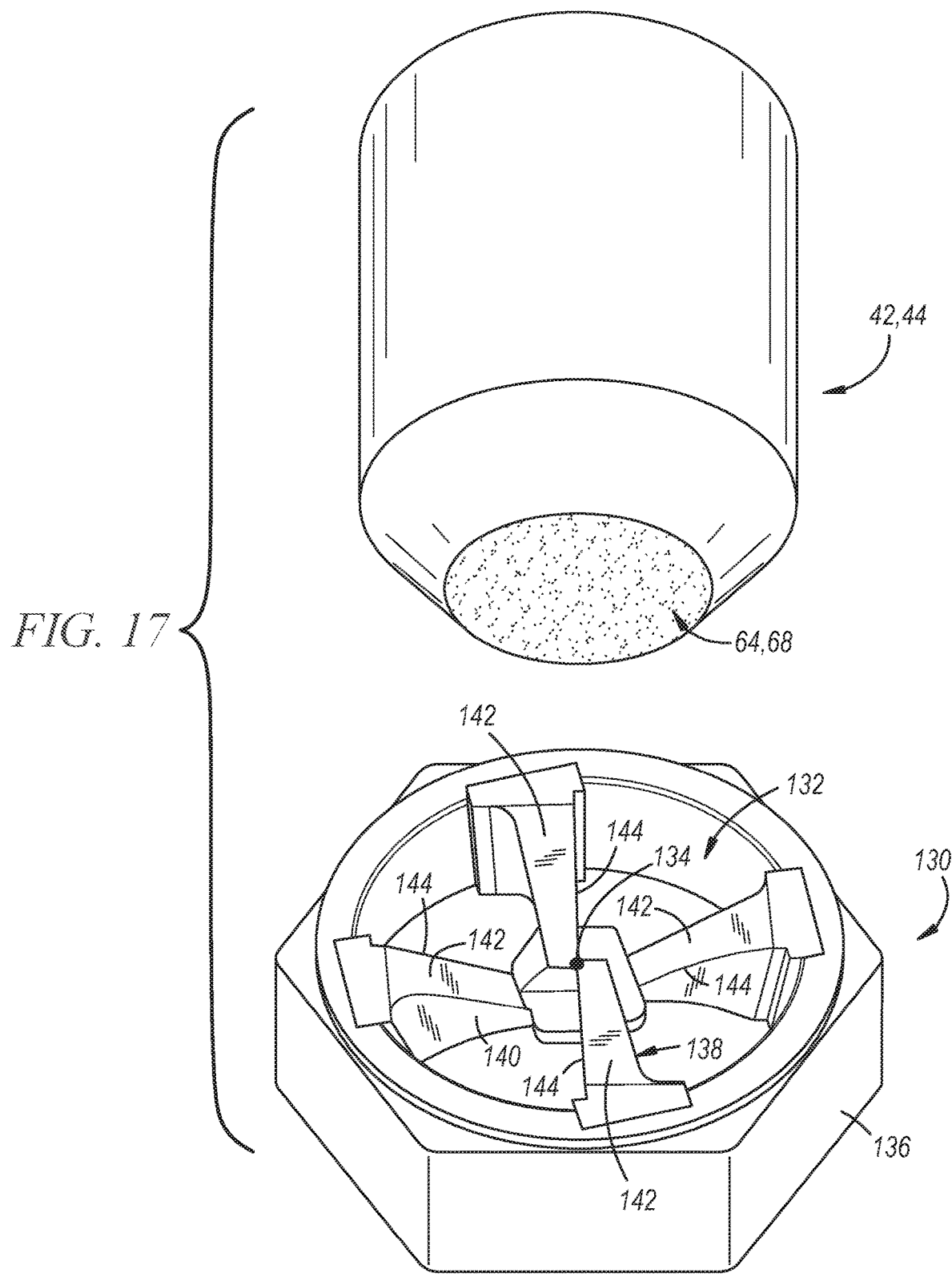
FIG. 17 is a perspective view of a cutting tool that includes a cutting socket for restoring the weld face of a welding electrode constructed as illustrated in FIG. 13 according to a third embodiment of the disclosed method
Figure 18:
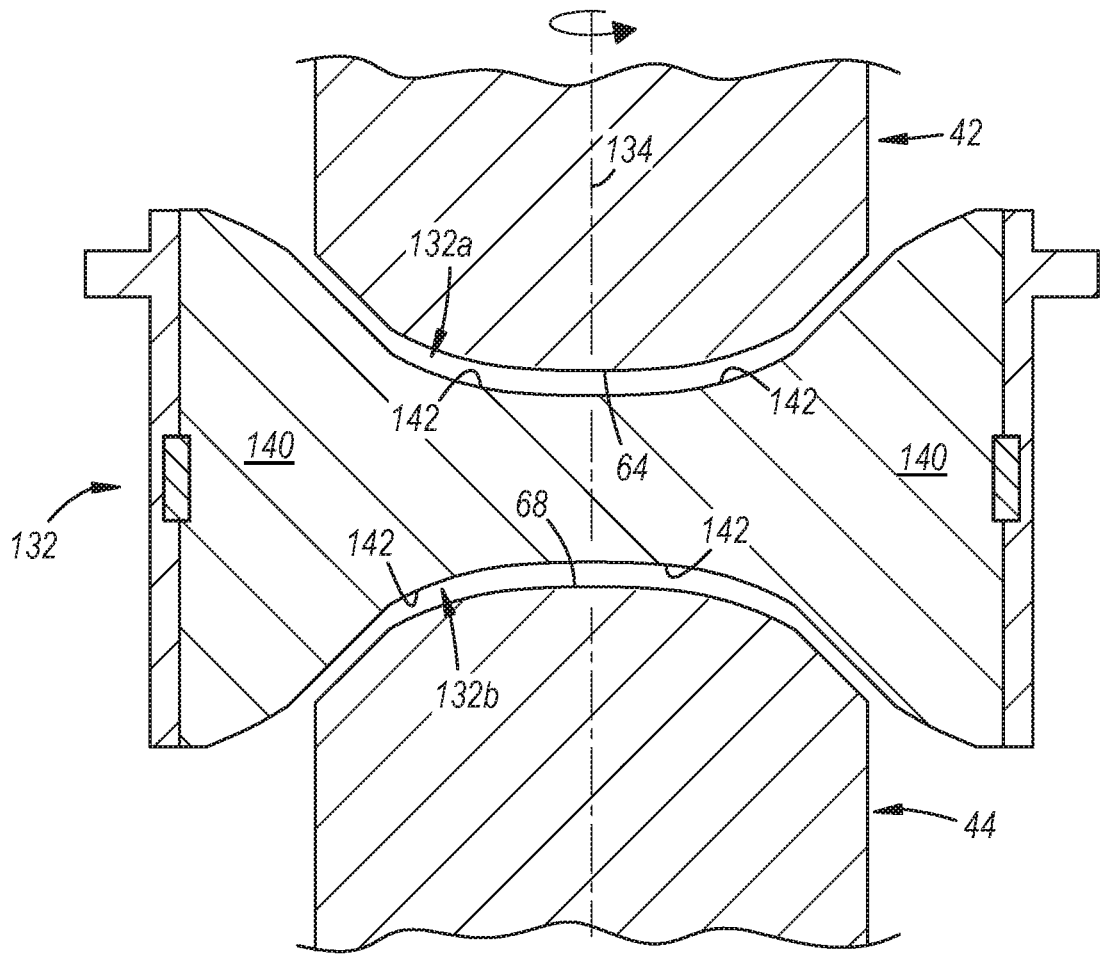
FIG. 18 is a cross-sectional view of a cutting tool that includes a first cutting socket and a second cutting socket so that, as part of being restored, two opposed welding electrodes having the construction illustrated in FIG. 13 can be redressed simultaneously during rotation of the cutting tool according to a third embodiment of the disclosed method.
Figure 19:
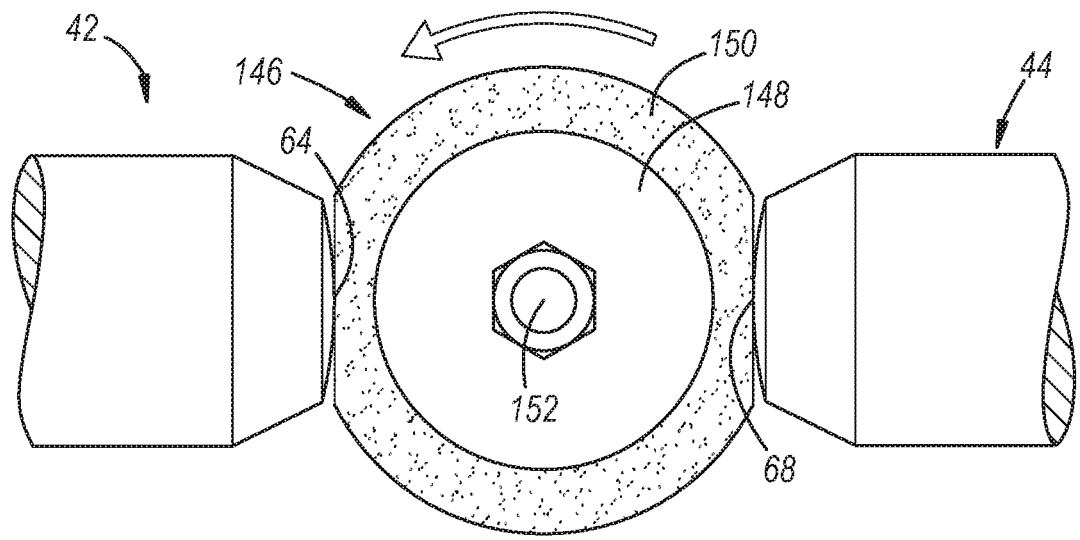
FIG. 19 is a general side elevational view of a texturing device that can texture the weld face of a welding electrode having the construction illustrated in FIG. 13 to provide the weld face with a microtexture as part of restoring the weld face according to a third embodiment of the disclosed method.

After the weld gun 40 has progressed through its patterned movement relative to the fixture of vehicle body members and formed the first, second, and third set of spot welds 290, 292, 294, in that order, each of the first and second weld faces 64, 68 is preferably restored by way of dressing and texturing to regenerate their original shape and weld face microtexture in preparation for the next progression through the scheduled sequence of spot welds, as shown in FIGS. 17-19. With reference now to FIG. 17, each of the weld faces 64, 68 is first redressed with a cutting tool 130 that includes a cutting socket 132 configured to shear off a depth of weld face material and to cut the weld face upon being rotated about an axis of rotation 134 of the cutting tool 130 when engaged with the weld face. The cutting tool 130 includes a body 136 and a cutting member 138 surrounded by the body 136. The cutting member 138 includes at least one cutting flute 140, and preferably four as shown, having a cutting surface 142 at an exposed axial end. The cutting surface(s) 142 include leading cutting edge 144 that is curved in complimentary conformance to the desired convexly domed profile of the weld face (e.g., a base weld face surface with a spherical radius of curvature between 15 mm and 300 mm and a weld face diameter between 6 mm and 22 mm).

Each of the first and second weld faces 64, 68 is redressed by, first, being inserted into the cutting socket 132 such that the weld face 62, 66 being redressed engages the cutting surface(s) 142 under an under pressure. When so inserted, the axis 61 (referring to FIG. 13) of the weld face 64, 68 is aligned with the axis of rotation 134 of the cutting tool 130. Next, the cutting tool 130 is rotated on its axis 134 while remaining forcibly engaged with the weld face 64, 68, typically completing anywhere from 1 to 10, or more narrowly 4 to 6, full rotations at a speed of 100 rpm to 1000 rpm, or more narrowly 200 rpm to 500 rpm. As the cutting tool 130 is rotated, the leading edge 144 of the cutting surface(s) 142 shears away weld face material and reestablishes the original diameter and convexly domed shape of the weld face 64, 68. The shearing action of the cutting surface(s) 142 shears away weld face material to a depth of 10 µm to 500 µm, or more narrowly 50 µm to 200 µm, over the course of the redressing operation.

The first and second weld faces 64, 68 may be redressed simultaneously in the same cutting tool, as illustrated in FIG. 18. There, it can be seen that the cutting tool 130 includes two cutting sockets 132 exposed at opposite axial ends of the tool 130. The two cutting sockets 132, more specifically, include a first cutting socket 132a and a second cutting socket 132b. The first weld face 64 of the first welding electrode 42 may be inserted into the first cutting socket 132a and the second weld face 68 of the second welding electrode 44 may be inserted into the second cutting socket 132b. In this way, when the cutting tool 130 is rotated about its axis of rotation 134, the first and second weld faces 64, 68 are simultaneously redressed as described as described above. Such redressing of the weld faces 64, 68 can even be performed without removing either of the welding electrodes 42, 44 from the weld gun 40, which helps make the redressing process as time efficient as possible. Of course, in an alternative implementation, the first and second weld faces 64, 68 may be redressed at separate times by the same or a different cutting tool 130 depending on the practicalities or other constraints of the manufacturing setting in which the weld gun 40 operates.

After the first and second weld faces 64, 68 have been dressed by the cutting tool 130, a new microtexture is established onto the base weld faces surfaces 63 of the weld faces 64, 68. Referring now to FIG. 19, the first and second weld faces 64, 68 may be textured simultaneously by a rotating texturing wheel 146 while still carried on the weld gun 40. The texturing wheel 146 may, as shown, include a frame 148 that circumferentially supports an abrasive media 150. The frame 148 may be a drum or rim that is mounted on a rotatable shaft 152, and the abrasive media may be a Scotch-Brite™ media supplied by the 3M Company of St. Paul, Minn., U.S.A., a stainless steel wire media, or another media. To texture the weld faces 64, 68 of the first and second welding electrodes 42, 44 with the texturing wheel 146, the weld faces 64, 68 are pressed against the abrasive media 150 as the wheel rotates about the shaft 152 to roughen the weld faces 64, 68 back to the desired microtextured surface roughness. The electrodes 42, 44 may optionally be turned or manipulated during engagement with the abrasive media 150 to make sure the desired surface roughness is reestablished to entire weld faces 64, 68.

It should be noted that a wide variety of texturing techniques are available to roughen the weld faces 64, 68 following redressing by the cutting tool 130 in order to complete the restoration of the weld faces 64, 68. In addition to the texturing wheel 146 shown in FIG. 19, for example, the new microtexture may be formed on the weld faces 64, 68 by abrasive or grit blasting in a contained blasting vessel with an abrasive media that includes small grit particles composed of as glass, sand, or steel. As another example, the microtexture may be formed on the weld faces 64, 68 of the first and second welding electrodes 42, 44 by dragging the weld faces 64, 68 across a stationary abrasive media, similar to the abrasive media 150 used in the texturing wheel 146, by movement of the weld gun 40. A single pass or multiple passes across the stationary abrasive media may be performed. In fact, if multiple passes are performed, the several passes across the abrasive media may be carried out in the same direction or in different directions to obtain varying roughness profiles within the microtexture. As still another example, the microtexture may be formed on weld faces 64, 68 by sanding the weld faces 64, 68 with sand paper having the appropriate grit size as a form of an abrasive media. Of all the texturing techniques that are available, the techniques that allow for simultaneous texturing of the weld faces 64, 68 without having to remove the welding electrodes 42, 44 from the weld gun 40 are preferred, although texturing practices that call for separate texturing of the weld faces 64, 68 and/or removal of the welding electrodes 42, 44 from the weld gun 40 are not prohibited.

The redressing and texturing of the first and second weld faces 64, 68 may be carried out in this embodiment after the third set of steel-to-steel spot welds 94 are formed to restore the welding electrodes 42, 44 for another progression through the spot welding sequence as part of the manufacture of another multi-component integrated body-in-white assembly 10. The redressing and texturing of the weld faces 64, 68, however, is not limited solely to that occasion, as the same redressing and texturing operations may be performed at any time that the weld faces 64, 68 are desired to be restored. For example, if the number of aluminum-to-aluminum spot welds 290 required to be formed in the first set is relatively large, then it may be desired to texture the first and second weld faces 64, 68 after the performance of one or more subsets of the first set of aluminum-to-aluminum spot welds 290 to ensure the microscopic surface roughness of each weld face 64, 68 is maintained and available to complete the first set of aluminum-to-aluminum spot welds 290. As another example, the number of aluminum-to-steel spot welds 292 and/or steel-to-steel spot welds 294 may be relatively low that more than one progression through the spot welding sequence is possible without the need to restore the weld faces 42, 44 of the welding electrodes 64, 68. In any event, because weld face material is removed during each redressing operation—as well as during each texturing operation but to a much lesser extent—the first and second welding electrodes 42, 44 will eventually have to be replaced on the weld gun 40 with new welding electrodes. The welding electrodes 42, 44 can typically be redressed 40 to 150 times as part of the restoration process before the cumulative removal of weld face material warrants their replacement.

The third embodiment of the disclosed method as described thus far has focused primarily on the construction of a multi-component integrated assembly in which workpiece stack-ups of having the following combinations of metal workpieces are subjected to resistance spot welding: (1) workpiece stack-ups that include two or more aluminum workpieces, (2) workpiece stack-ups that include an aluminum workpiece and an adjacent steel workpiece, and (3) workpiece stack-ups that include two or more steel workpieces. In that scenario, as discussed above, the spot welding sequence calls for forming the first set of aluminum-to-aluminum spot welds 290, the second set of aluminum-to-steel spot welds 292, and the third set of steel-to-steel spot welds 294, in that order, while by restoring the weld faces 64, 68 as needed by way of redressing and texturing to regenerate their original shapes and geometries in accordance with the microtextured electrode design. The disclosed method, however, is not necessarily limited only to those circumstances in which all three types of spot welds 290, 292, 294 need to be formed. Rather, the third embodiment of the disclosed method can, in fact, be practiced with any grouping of two of the following combinations of metal workpieces in much the same way as the first and second embodiments: (1) workpiece stack-ups that include two or more aluminum workpieces, (2) workpiece stack-ups that include an aluminum and an adjacent steel workpiece, and (3) workpiece stack-ups that include two or more steel workpieces.

If two types of workpiece stack-ups are in need of spot welding during construction of a multi-component integrated assembly, such as a body-in-white, the same sequence of spot welding is retained for those workpiece stack-ups that are present. That is, any aluminum-to-aluminum spot welds 290 (if needed) are formed first, any aluminum-to-steel spot welds 292 (if needed) are formed next, and any steel-to-steel spot welds 294 (if needed) are formed last, with restoration of the weld faces 64, 68 preferably being performed after completion of the spot welding sequence. Several examples of resistance spot welding two types of workpiece stack-ups have been discussed in detail above in connection with the first and second embodiments of the disclosed method. Each of those examples is equally applicable to and incorporated into the present discussion of the third embodiment. Accordingly, a duplicative description of those particular examples need not be provided here.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding workpiece stack-ups of different combinations of metal workpieces with a single weld gun using the same set of welding electrodes, the method comprising:

providing a weld gun that carries a first welding electrode and an opposed second welding electrode, each of the first and second welding electrodes having a weld face that comprises an original shape and oxide-disrupting structural features, wherein the oxide-disrupting structural features are in the form of a series of upstanding circular ridges, a series of recessed circular grooves, or a microtexture;

positioning multiple vehicle body members relative to each other to provide a plurality of workpiece stack-ups, each of the workpiece stack-ups comprising a workpiece from one of the vehicle body members and an adjacent overlapping workpiece from at least one other of the vehicle body members and further having a first side and a second side to support pressed contact by the first welding electrode against the first side of the workpiece stack-up and pressed contact by the second welding electrode against the second side of the workpiece stack-up, wherein the plurality of workpiece stack-ups comprises a plurality of first workpiece stack-ups that include an aluminum workpiece and an adjacent overlapping steel workpiece, and wherein the plurality of workpiece stack-ups further comprises at least one of (i) a plurality of second workpiece stack-ups that include only overlapping aluminum workpieces or (ii) a plurality of third workpiece stack-ups that include only overlapping steel workpieces;

forming a set of aluminum-to-steel spot welds by progressing the weld gun to each of the plurality of first workpiece stack-ups and, at least once at each of the first workpiece stack-ups, pressing the first welding electrode directly against the first side of the first workpiece stack-up and pressing the second welding electrode directly against the second side of the first workpiece stack-up at a weld site and then passing an electrical current between the first and second welding electrodes and through the first workpiece stack-up to form an aluminum-to-steel spot weld that comprises a weld joint contained within the aluminum workpiece that weld bonds the aluminum workpiece to the adjacent steel workpiece;

forming at least one of (1) a set of aluminum-to-aluminum spot welds before forming the set of aluminum-to-steel spot welds or (2) forming a set of steel-to-steel spot welds after forming the set of aluminum-to-steel spot welds, wherein forming the set of aluminum-to-aluminum spot welds includes progressing the weld gun to each of the plurality of second workpiece stack-ups that includes only overlapping aluminum workpieces and, at least once at each of the second workpiece stack-ups, pressing the first welding electrode directly against the first side of the second workpiece stack-up and pressing the second welding electrode directly against the second side of the second workpiece stack-up at a weld site and then passing an electrical current between the first and second welding electrodes and through the second workpiece stack-up to form an aluminum-to-aluminum spot weld that comprises an aluminum nugget that fusion welds the aluminum workpieces together, and wherein forming the set of steel-to-steel spot welds includes progressing the weld gun to each of the plurality of third workpiece stack-ups that includes only overlapping steel workpieces and, at least once at each of the third workpiece stack-ups, pressing the first welding electrode directly against the first side of the third workpiece stack-up and pressing the second welding electrode directly against the second side of the third workpiece stack-up at a weld site and then passing an electrical current between the first and second welding electrodes and through the third workpiece stack-up to form a steel-to-steel spot weld that comprises a steel nugget that fusion welds the steel workpieces together; and restoring each of the weld faces of the first and second welding electrodes to regenerate its original shape and oxide-disrupting structural features, wherein restoring each of the weld faces includes (i) inserting the weld face into a cutting socket of a cutting tool and rotating the cutting tool to shear away weld face material to reestablish the original shape of the weld face while fashioning a new series of upstanding circular ridges or a new series of recessed circular grooves or (ii) redressing the weld face by inserting the weld face into a cutting socket of a cutting tool and rotating the cutting tool to shear away weld face material to reestablish the original shape of the weld face followed by texturing the weld face with an abrasive media to establish a new microtexture of the weld face.

2. The method set forth in claim 1, wherein forming a set of aluminum-to-aluminum spot welds is practiced before forming the set of aluminum-to-steel spot welds, and wherein restoring each of the weld faces of the first and second welding electrodes is performed after forming the set of aluminum-to-steel spot welds.

3. The method set forth in claim 1, wherein forming a set of steel-to-steel spot welds is practiced after forming the set of aluminum-to-steel spot welds, and wherein restoring each of the weld faces of the first and second welding electrodes is performed after forming the set of steel-to-steel spot welds.

4. The method set forth in claim 1, wherein forming a set of aluminum-to-aluminum spot welds is practiced before forming the set of aluminum-to-steel spot welds, wherein forming a set of steel-to-steel spot welds is practiced after forming the set of aluminum-to-steel spot welds, and wherein restoring each of the weld faces of the first and second welding electrodes is performed after forming the set of steel-to-steel spot welds.

5. The method set forth in claim 1, wherein the oxide-disrupting structural features included on each weld face comprise a series of upstanding circular ridges that are centered about and surround a central axis of the weld face and which project outwardly from a base weld face surface of the weld face, the series of upstanding circular ridges including anywhere from two circular ridges to ten circular ridges starting from an innermost ridge that immediately surrounds the central axis of the weld face and ending with an outermost ridge that is farthest from the central axis of the weld face.

6. The method set forth in claim 5, wherein restoring each of the weld faces of the first and second welding electrodes comprises:

inserting the weld face into a cutting socket of a cutting tool so that the weld face engages a cutting surface and the central axis of the weld face is aligned with an axis of rotation of the cutting tool, the cutting surface defining recessed grooves that extend from a leading edge of the cutting surface towards a trailing edge; and rotating the cutting tool while engaged with the weld face to shear away weld face material to reestablish the original shape of the weld face while the recessed grooves fashion a new series of upstanding circular ridges that project outwardly from the base weld face surface of the weld face.

7. The method set forth in claim 6, wherein restoring each of the weld faces of the first and second welding electrodes is performed simultaneously without removing either of the welding electrodes from the weld gun.

8. The method set forth in claim 1, wherein the oxide-disrupting structural features included on each weld face comprise a microtexture that includes three-dimensional microscopic peaks-and-valleys covering at least 75% of a base weld face surface of the weld face to provide a surface roughness (Ra) that ranges from 2 μm to 50 μm.

9. The method set forth in claim 8, wherein restoring each of the weld faces of the first and second welding electrodes comprises:

redressing the weld face by inserting the weld face into a cutting socket of a cutting tool so that the weld face engages a cutting surface and the central axis of the weld face is aligned with an axis of rotation of the cutting tool, and rotating the cutting tool while engaged with the weld face to shear away weld face material to reestablish the original shape of the weld face; and texturing the weld face with an abrasive media to establish a new microtexture on the base weld face surface of the weld face.

10. A method of resistance spot welding workpiece stack-ups of different combinations of metal workpieces with a single weld gun using the same set of welding electrodes, the method comprising:

providing a weld gun that carries a first welding electrode and an opposed second welding electrode, each of the first and second welding electrodes having a weld face that comprises an original shape and oxide-disrupting structural features, wherein the oxide-disrupting structural features are in the form of a series of upstanding circular ridges, a series of recessed circular grooves, or a microtexture;

supporting a fixture of multiple vehicle body members of a vehicle body-in-white relative to each other to provide a plurality of workpiece stack-ups, each of the workpiece stack-ups comprising a workpiece from one of the vehicle body members and an adjacent overlapping workpiece from at least one other of the vehicle body members and further having a first side and a second side to support pressed contact by the first welding electrode against the first side of the workpiece stack-up and pressed contact by the second welding electrode against the second side of the workpiece stack-up, wherein the plurality of workpiece stack-ups comprises (i) at least one first workpiece stack-up that includes an aluminum workpiece and an adjacent overlapping steel workpiece, (ii) at least one second workpiece stack-up that includes only overlapping aluminum workpieces, and (iii) at least one third workpiece stack-up that includes only overlapping steel workpieces;

progressing the weld gun through the fixture of vehicle body members to form one or more spot welds in each of the plurality of workpiece stack-ups to support securing the multiple vehicle body members together into the vehicle body-in-white, the weld gun progressing through the fixture of vehicle body members to form, in sequential order, a set of aluminum-to-aluminum spot welds, a set of aluminum-to-steel spot welds, and a set of steel to steel spot welds; and restoring each of the weld faces of the first and second welding electrodes to regenerate its original shape and oxide-disrupting structural features, wherein restoring each of the weld faces includes (i) inserting the weld face into a cutting socket of a cutting tool and rotating the cutting tool to shear away weld face material to reestablish the original shape of the weld face while fashioning a new series of upstanding circular ridges or a new series of recessed circular grooves or (ii) redressing the weld face by inserting the weld face into a cutting socket of a cutting tool and rotating the cutting tool to shear away weld face material to reestablish the original shape of the weld face followed by texturing the weld face with an abrasive media to establish a new microtexture of the weld face, wherein forming the set of aluminum-to-aluminum spot welds comprises, at least once at each of the second workpiece stack-ups that includes only aluminum workpieces, pressing the first welding electrode directly against the first side of the second workpiece stack-up while pressing the second welding electrode directly against the second side of the second workpiece stack-up at a weld site and then passing an electrical current between the first and second welding electrodes and through the second workpiece stack-up to form an aluminum-to-aluminum spot weld that comprises an aluminum nugget that fusion welds the aluminum workpieces together;

wherein forming the set of aluminum-to-steel spot welds comprises, at least once at each of the first workpiece stack-ups that includes an aluminum workpiece and an adjacent overlapping steel workpiece, pressing the first welding electrode directly against the first side of the first workpiece stack-up and pressing the second welding electrode directly against the second side of the first workpiece stack-up at a weld site and then passing an electrical current between the first and second welding electrodes and through the first workpiece stack-up to form an aluminum-to-steel spot weld that comprises a weld joint contained within the aluminum workpiece that weld bonds the aluminum workpiece to the adjacent steel workpiece;

wherein forming the set of steel-to-steel spot welds comprises, at least once at each of the third workpiece stack-ups that includes only steel workpieces, pressing the first welding electrode directly against the first side of the third workpiece stack-up and pressing the second welding electrode directly against the second side of the third workpiece stack-up at a weld site and then passing an electrical current between the first and second welding electrodes and through the third workpiece stack-up to form a steel-to-steel spot weld that comprises a steel nugget that fusion welds the steel workpieces together.

11. The method set forth in claim 10, wherein the set of aluminum-to-aluminum spot welds constitutes between 2 and 40 aluminum-to-aluminum spot welds, wherein the set of aluminum-to-steel spot welds constitutes between 2 and 40 aluminum-to-steel spot welds, and wherein the set of steel-to-steel spot welds constitutes between 2 to 40 steel-to-steel spot welds.

12. The method set forth in claim 10, wherein the oxide-disrupting structural features included on the weld face of each of the first and second welding electrodes comprise a series of upstanding circular ridges that are centered about and surround a central axis of the weld face and which project outwardly from a base weld face surface of the weld face, the series of upstanding circular ridges including anywhere from two circular ridges to ten circular ridges starting from an innermost ridge that immediately surrounds the central axis of the weld face and ending with an outermost ridge that is farthest from the central axis of the weld face.

13. The method set forth in claim 10, wherein each of the first welding electrode and the second welding electrode is composed of a copper alloy, and wherein the weld face of each of the first welding electrode and the second welding electrode has a convexly domed base weld face surface and a diameter that ranges from 6 mm to 22 mm.

14. The method set forth in claim 13, wherein the convexly domed base weld face surface of each of the first and second welding electrodes has a radius of curvature that ranges from 15 mm to 300 mm.

15. A method of resistance spot welding workpiece stack-ups of different combinations of metal workpieces with a single weld gun using the same set of welding electrodes, the method comprising:

providing a weld gun that carries a first welding electrode and an opposed second welding electrode, each of the first and second welding electrodes having a weld face that comprises an original shape and oxide-disrupting structural features, wherein the oxide-disrupting structural features are in the form of a series of upstanding circular ridges, a series of recessed circular grooves, or a microtexture;

supporting a fixture of multiple vehicle body members of a vehicle body-in-white relative to each other to provide a plurality of workpiece stack-ups, each of the workpiece stack-ups comprising a workpiece from one of the vehicle body members and an adjacent overlapping workpiece from at least one other of the vehicle body members and further having a first side and a second side, wherein the plurality of workpiece stack-ups comprises at least one workpiece stack-up that includes an aluminum workpiece and an adjacent overlapping steel workpiece;

progressing the weld gun through the fixture of multiple vehicle body members to form one or more spot welds in each of the plurality of workpiece stack-ups to support securing the multiple vehicle body members together into the vehicle body-in-white, the weld gun progressing through the fixture of vehicle body members to form a set of aluminum-to-steel spot welds in the at least one workpiece stack-up that includes an aluminum workpiece and an overlapping adjacent steel workpiece as well as at least one of (i) a set of aluminum-to-aluminum spot welds in at least one workpiece stack-up that includes only overlapping aluminum workpieces or (ii) a set of steel-to-steel spot welds in at least one workpiece stack-up that includes only overlapping steel workpieces; and restoring each of the weld faces of the first and second welding electrodes to regenerate its original shape and oxide-disrupting structural features after progressing the weld gun through the fixture of multiple vehicle body members to form one or more spot welds in each of the plurality of workpiece stack-ups, wherein restoring each of the weld faces includes (i) inserting the weld face into a cutting socket of a cutting tool and rotating the cutting tool to shear away weld face material to reestablish the original shape of the weld face while fashioning a new series of upstanding circular ridges or a new series of recessed circular grooves or (ii) redressing the weld face by inserting the weld face into a cutting socket of a cutting tool and rotating the cutting tool to shear away weld face material to reestablish the original shape of the weld face followed by texturing the weld face with an abrasive media to establish a new microtexture of the weld face.

16. The method set forth in claim 15, wherein forming a set of aluminum-to-aluminum spot welds is practiced before forming the set of aluminum-to-steel spot welds, wherein forming a set of steel-to-steel spot welds is practiced after forming the set of aluminum-to-steel spot welds, and wherein restoring each of the weld faces of the first and second welding electrodes is performed after forming the set of steel-to-steel spot welds, the set of aluminum-to-aluminum spot welds constituting between 2 and 40 aluminum-to-aluminum spot welds, the set of aluminum-to-steel spot welds constituting between 2 and 40 aluminum-to-steel spot welds, and the set of steel-to-steel spot welds constituting between 2 to 40 steel-to-steel spot welds.

\* \* \* \* \*